(12) United States Patent  
Kuge

(10) Patent No.: US 7,634,331 B2  
(45) Date of Patent: Dec. 15, 2009

(54) DRIVING INTENTION ESTIMATION SYSTEM, VEHICLE OPERATION ASSISTANCE SYSTEM, AND VEHICLE EQUIPPED THEREWITH

(75) Inventor: Nobuyuki Kuge, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 563 days.

(21) Appl. No.: 11/348,108

(22) Filed: Feb. 6, 2006

(65) Prior Publication Data

US 2006/0178789 A1 Aug. 10, 2006

(30) Foreign Application Priority Data

Feb. 7, 2005 (JP) .............................. 2005-030560

(51) Int. Cl.
- G05D 1/00 (2006.01)
- G06F 7/00 (2006.01)
- G06F 17/10 (2006.01)

(52) U.S. Cl. ............................... 701/1; 701/36; 701/301

(58) Field of Classification Search ..................... 701/1, 701/35

See application file for complete search history.

(56) References Cited

U.S. PATENT DOCUMENTS

| 5,984,435 A | * | 11/1999 | Tsukamoto et al. | .......... 303/191 |
| 6,282,478 B1 | | 8/2001 | Akita | |
| 6,304,811 B1 | | 10/2001 | Prestl | |
| 6,604,042 B2 | * | 8/2003 | Maruko et al. | ................. 701/96 |

(Continued)

FOREIGN PATENT DOCUMENTS

DE 101 32 386 1/2003

(Continued)

OTHER PUBLICATIONS

Japanese Search Report No. 2005-030560 dated Jul. 24, 2007.

(Continued)

*Primary Examiner*—Mark Hellner  
*Assistant Examiner*—Helal A Algahaim  
(74) *Attorney, Agent, or Firm*—Young Basile

(57) ABSTRACT

A system for estimating a driving intention of a vehicle driver comprises a vehicle surroundings detection device for detecting the vehicle surroundings, an operational input detection device for detecting operational input by the real driver, a first imaginary driver operational input calculation device for calculating the required operational input by a first method based on the vehicle surroundings in order to execute the driving intention of each imaginary driver for multiple differing imaginary drivers, a second imaginary driver operational input calculation device for calculating the required operational input by a second method that differs from the first method based on information differing from said vehicle surroundings in order to execute the driving intention of each imaginary driver, an imaginary driver operational input selection device for selecting either the operational input of the multiple imaginary drivers computed by the first driver operational input calculation device or the operational input of multiple imaginary drivers computed by the second driver operational input calculation device, based on the running condition, an operational input degree of similarity calculation device for calculating each degree of similarity between the operational input of multiple imaginary drivers and the operational input for the real driver, and a driving intention estimation device for estimating the driving intention of said real driver based on the multiple operational input degree of similarity.

16 Claims, 18 Drawing Sheets

U.S. PATENT DOCUMENTS

| | | | |
|---|---|---|---|
| 2002/0138192 A1* | 9/2002 | Lueder et al. | 701/93 |
| 2003/0139883 A1* | 7/2003 | Takafuji et al. | 701/301 |
| 2003/0236602 A1* | 12/2003 | Kuge et al. | 701/36 |
| 2004/0064241 A1* | 4/2004 | Sekiguchi | 701/96 |
| 2005/0131588 A1 | 6/2005 | Kuge et al. | |
| 2005/0131590 A1* | 6/2005 | Kuge et al. | 701/1 |

FOREIGN PATENT DOCUMENTS

| | | |
|---|---|---|
| DE | 101 32 386 A1 | 1/2003 |
| EP | 0 890 470 | 1/1999 |
| EP | 0 890 470 A2 | 1/1999 |
| EP | 1 065 520 | 1/2001 |
| EP | 1 065 520 A2 | 1/2001 |
| JP | 2000343980 | 12/2000 |
| JP | 2002002518 | 1/2002 |
| JP | 2002331850 | 11/2002 |
| JP | 2004017930 | 1/2004 |
| JP | 2004189177 | 7/2004 |
| JP | 2005001500 | 1/2005 |
| JP | 2005182123 | 7/2005 |
| WO | 2004/008648 A2 | 1/2004 |
| WO | WO-2004/008648 | 1/2004 |

OTHER PUBLICATIONS

European Search Report 06250626.6-2421 dated Jun. 13, 2006.

* cited by examiner

DRIVING INTENTION ESTIMATION SYSTEM, VEHICLE OPERATION ASSISTANCE SYSTEM, AND VEHICLE EQUIPPED THEREWITH

RELATED APPLICATION

The disclosure of Japanese Patent Application No. 2005-030560, filed Feb. 7, 2005, including the specification, claims and drawings thereof, is incorporated herein by reference in its entirety.

TECHNICAL FIELD

Disclosed herein are driving intention estimation systems for estimating the driving intentions of drivers of vehicles and vehicle operation assistance systems for assisting driver operation corresponding to driving intentions.

BACKGROUND

Conventional driving intention estimation systems estimate driving intention using the driver's sight-line behavior. (See, for example, unexamined Japanese patent application No. 2002-331850). These devices reflect the driver's sight-line onto a forward projection surface and estimate driver intention using sight-line frequency distribution to multiple regions of the projection surface.

The conventional systems described above have been capable of estimating driving intention by using the driver's sight-line and the frequency of that sight-line. However, problems include the fact that driver sight-line behavior is influenced variously by differing driving environments, and accuracy of intention estimation differs between individual drivers; therefore it is desirable to provide a solution that estimates driving intention with consistently higher accuracy.

The present system for estimating a driver intention comprises an information detector that detects information necessary to operate a vehicle, an operational input detection device for detecting an operational input by a real driver, first and second imaginary driver operational input calculation devices configured to respectively calculate imaginary operational inputs of multiple imaginary drivers based on the information from the information detector, wherein the first and second imaginary driver operational input calculation devices calculate the imaginary operational inputs of the multiple imaginary drivers based on different methods or different information, an imaginary driver operational input selection device configured to select one of the multiple imaginary drivers based on the imaginary operation inputs calculated by the first and second imaginary driver operational input calculation devices; and a driving intention estimator configured to estimate an intention of the real driver based on the operational input of the real driver detected by the operational input detection device and the one of the multiple imaginary drivers selected by the imaginary driver operational input selection device.

BRIEF DESCRIPTION OF THE DRAWINGS

These and other features and advantages of the present systems will be apparent from the following description taken in conjunction with the accompanying drawings, in which.

DETAILED DESCRIPTION OF THE ILLUSTRATED EMBODIMENTS

First Embodiment

Figure 1:
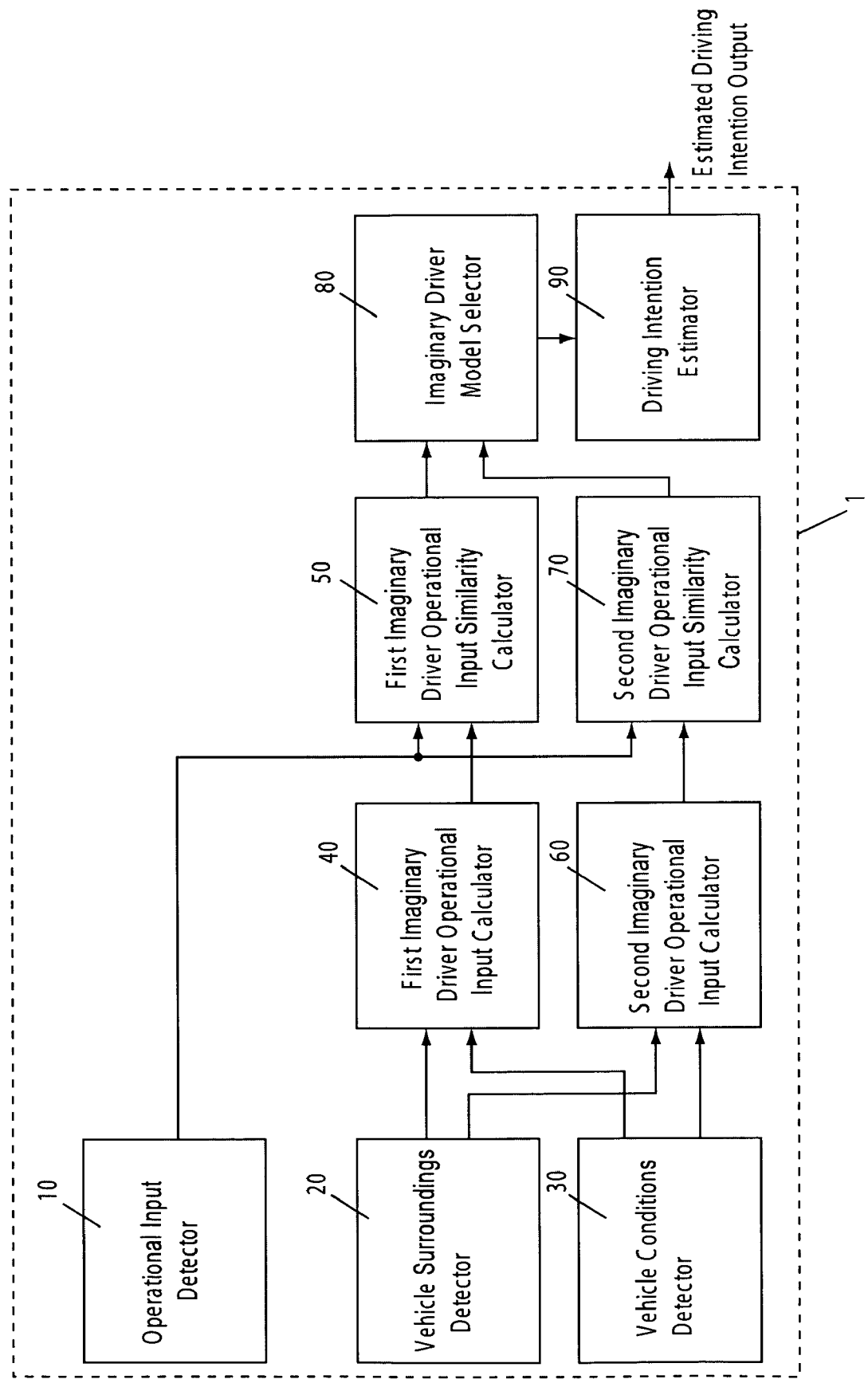
FIG. 1 is a block diagram of a first embodiment comprising a driver's intention estimation system.

FIG. 1 is a system drawing illustrating the structure of the present driving intention estimation system according to a first embodiment thereof.

Driving intention estimation system 1 comprises operational input detector 10 for detecting the operational input of the driver, vehicle surroundings detector 20 for detecting the surroundings of the vehicle, vehicle conditions detector 30 for detecting conditions of the vehicle itself, first imaginary driver operational input calculator ("first IDOI calculator") 40, first imaginary driver operational input similarity calculator ("first IDOI similarity calculator") 50, second imaginary driver operational input calculator ("second IDOI calculator") 60, second imaginary driver operational input similarity calculator ("second IDOI similarity calculator") 70, imaginary driver model selector 80, and driving intention estimator 90.

Estimation system 1 makes multiples settings for imaginary drivers having driving intentions, and it compares the operations of the imaginary drivers to the operations of the real driver. Then it estimates driving intention based on the highest degree of similarity between the operation of each of the imaginary drivers and the operation of the real driver. At this time, it estimates driving intention based on a collective degree of similarity of driving operations for a period between the current time and a predetermined recent past time.

Operational input detector 10 detects the vehicle steering angle by means of a steering angle sensor or similar device disposed in the steering system. Vehicle surroundings detector 20 detects the lateral positioning of the vehicle in the lane of travel, the yaw angle between the vehicle and the lane, and the yaw rates of the vehicle, by means of a camera forwardly directed to acquire images of the road in front of the vehicle, a yaw angle sensor, and a yaw rate sensor, or similar devices. Furthermore, vehicle surroundings detector 20 also provides an image processing device for processing the image signals acquired by the forwardly directed camera. Vehicle condition detector 30 provides a speed sensor for detecting vehicle speed.

As an example supporting implementation, a microcomputer is used comprising first IDOI calculator 40, first IDOI similarity calculator 50, second IDOI calculator 60, second IDOI similarity calculator 70, imaginary driver model selector 80, and driving intention estimator 90. Another example is configuration of each of these functions through a Central Processing Unit (CPU) software format in a microcontroller configured with CPU peripheral components such as CPU, Read Only Memory (ROM), and Random Access Memory (RAM).

First IDOI calculator 40 and second IDOI calculator 60 compute the required operational input needed for accomplishing the intentions of multiple imaginary drivers invested with varying driving intentions. However, first IDOI calculator 40 and second IDOI calculator 60 use different methods or processes to formulate multiple imaginary drivers and compute operational inputs.

Specifically, first IDOI calculator 40 computes operational inputs for multiple imaginary drivers based on the relative relationship between the subject vehicle and the running lane markers (lane demarcation markers) for the lane in which the vehicle is traveling, as detected by vehicle surroundings detector 10. Second IDOI calculator 60 computes the operational inputs of multiple imaginary drivers based on information that differs from the relative relationship of the lane markers and the subject vehicle, specifically, the relative relationship between the subject vehicle and a preceding vehicle as detected by vehicle surroundings detector 20. Hereinafter is described the model for imaginary drivers computed by first IDOI calculator 40 as the forward reference model and the model for imaginary drivers computed by second IDOI calculator 60 as the preceding vehicle reference model.

First IDOI similarity calculator 50 computes the degree of similarity between the operational input of the real driver detected by operational input detector 10 and the operational inputs of the imaginary drivers of the forward reference model computed by first IDOI calculator 40. Second IDOI similarity calculator 70 computes the degree of similarity between the operational input of the real driver and the operational inputs of the imaginary drivers of the preceding vehicle reference model computed by second IDOI calculator 60.

Figure 2:
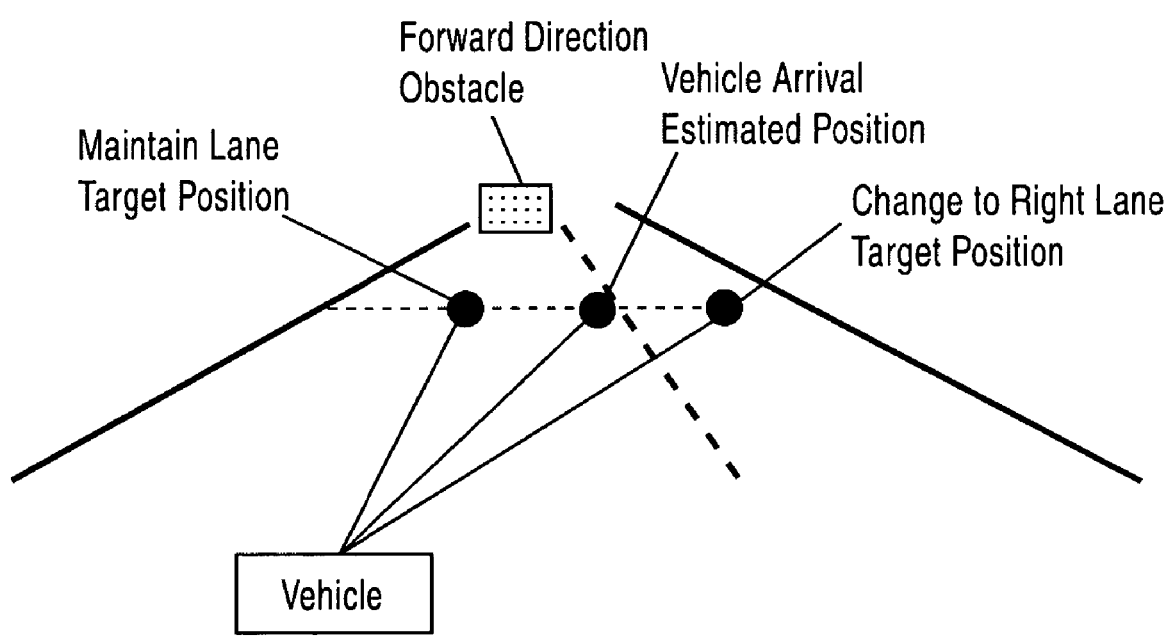
FIG. 2 is a diagram showing forward reference points for a subject vehicle.

The forward reference model, as shown in FIG. 2, sets in the forward direction of the subject vehicle target positions as forward reference points, which target positions satisfy driving intention for the real driver, and determines operational inputs for imaginary drivers by postulating performance of driving operations that will attain the forward reference points. There are times when the real driver will execute driving operations based on information other than forward reference points, in dependence on vehicle running conditions. For example, when the distance between the subject vehicle and a preceding vehicle is small, the real driver will tend to execute driving operations with attention to the preceding vehicle, in which case the degree of similarity will decrease between the operational inputs of the imaginary drivers, computed on the basis of forward reference points, and the operational input of the real driver. This decreases accuracy for estimation of the driving intention of the real driver.

At that point, imaginary driver model selector 80 selects, based on the running conditions, either the forward reference model or the preceding vehicle reference model, to support the technique (strategy) used at the time the real driver determines the operational input. Specifically, it selects either the degree of similarity computed by first IDOI similarity calculator 50 or the degree of similarity computed by second IDOI similarity calculator 70, corresponding to the running conditions of the subject vehicle.

Driving intention estimation 90 uses the imaginary driver model selected by imaginary driver model selector 80 to compute and compare the collective degree of similarity between the operational inputs of the multiple imaginary drivers and the operational input of the real driver, and thereby estimates the driving intention of the real driver.

Figure 3:
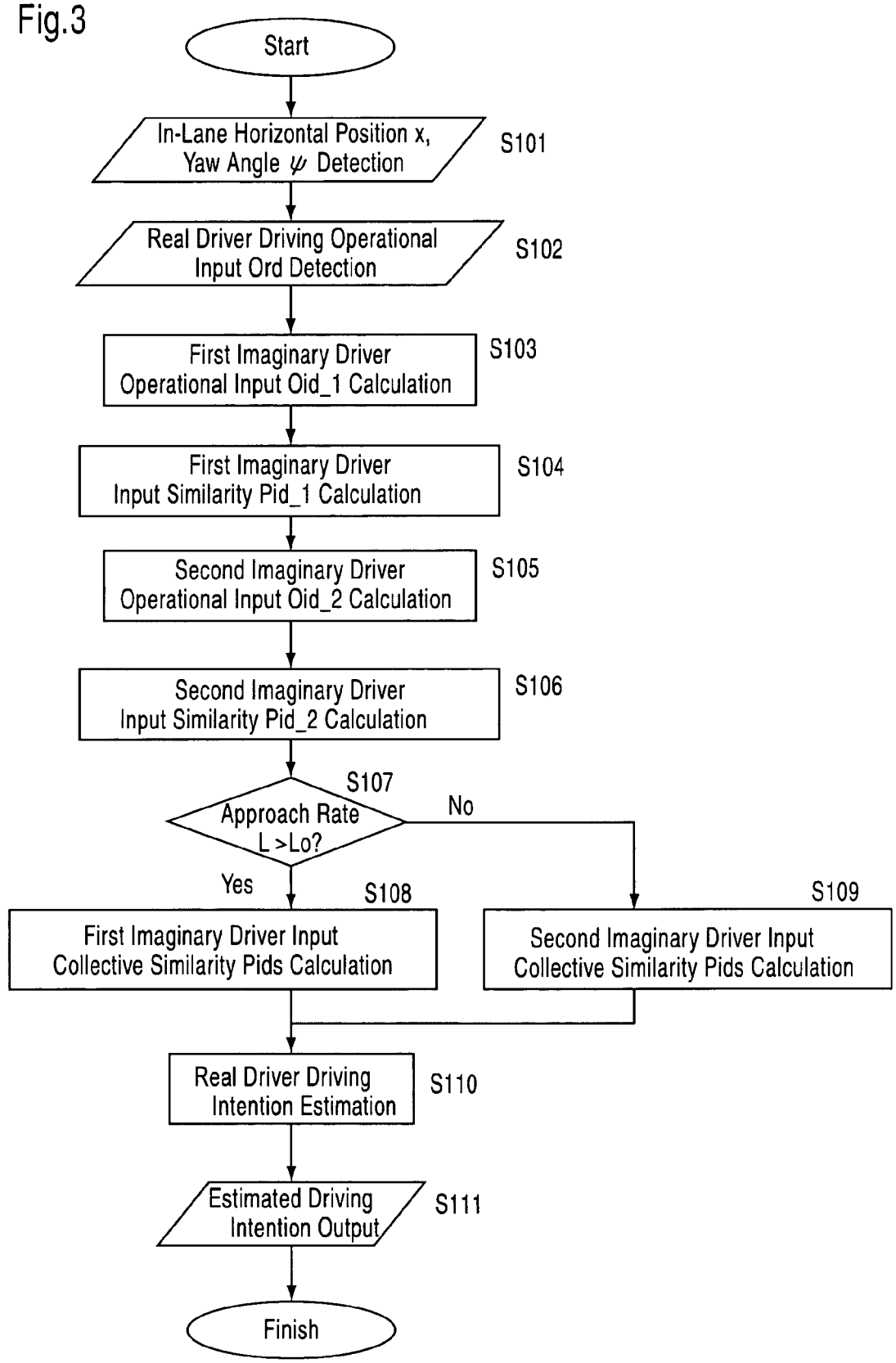
FIG. 3 is a flowchart illustrating a driver's intention estimation method or process of the embodiment of FIG. 1.

The following section describes in detail operation of driving intention estimation device 1 according to the first embodiment with reference to FIG. 3, which is a flowchart. showing the processing steps of the driving intention estimation method or process of estimation system 1. The process represented in FIG. 3 is performed continuously at fixed time intervals (for example, 50 msec).

Figure 4:
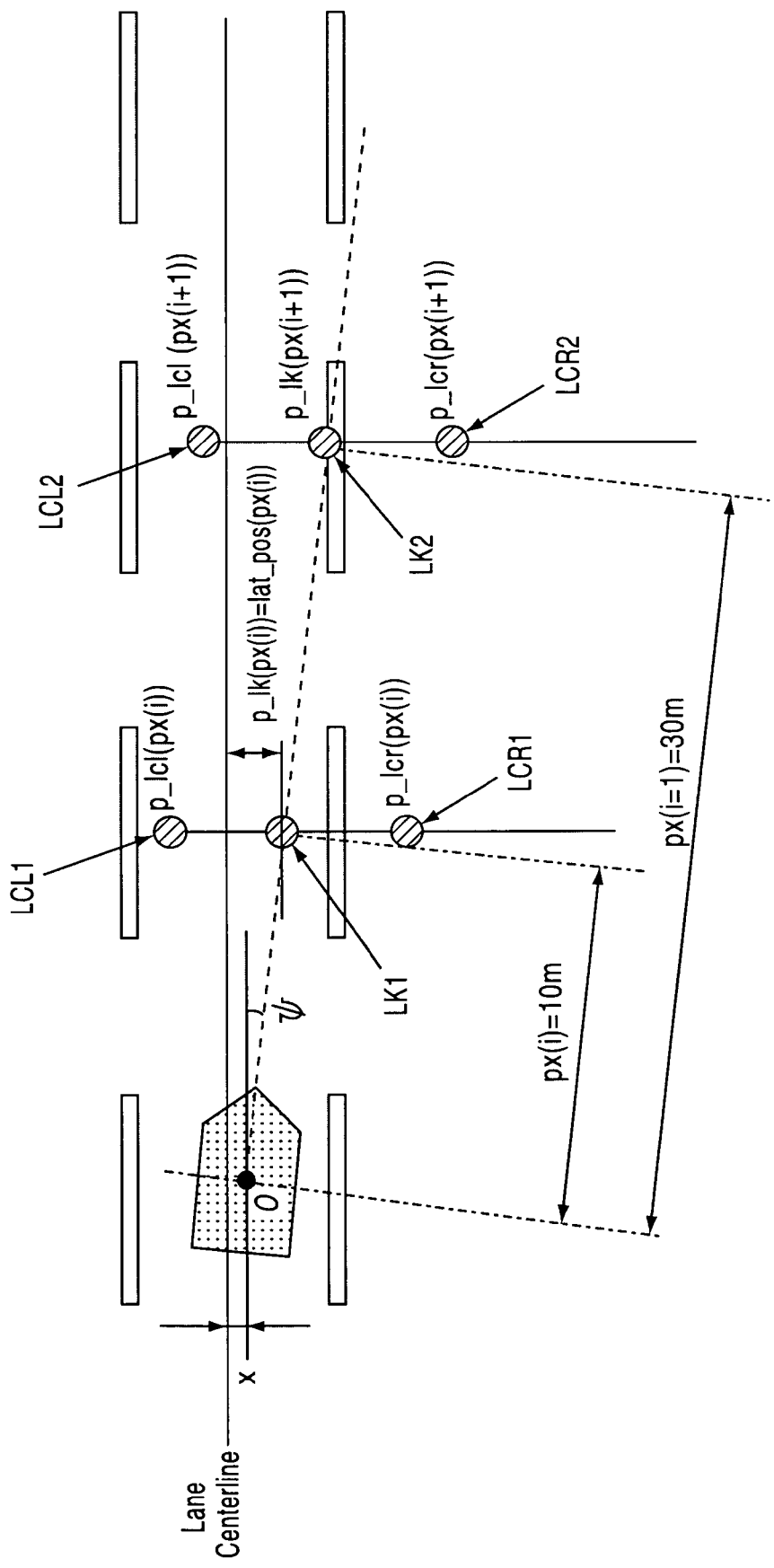
FIG. 4 is a diagram of a computation device for imaginary driver operational input.

At Step S101 the current lane lateral position x and yaw angle PSI of the subject vehicle are detected. As shown in FIG. 4, the lane lateral position x is the distance in the lateral direction from the center line of the lane in which the vehicle is traveling to vehicle center point O, and yaw angle PSI is the rotational angle of the subject vehicle in relation to the forwardly advancing direction of the vehicle. In addition, at this step there is also detected the lane lateral position Px of a preceding vehicle (refer to FIG. 5). Lateral position x of the subject vehicle and lateral position Px of the preceding vehicle are both expressed as a positive value when disposed to the right side of the lane center and a negative value when disposed to the left side.

At Step S102, current steering angle $\theta rd$ detected by operational input detector 10 is read as operational input Ord of the real driver. Step S103 computes the operational inputs of multiple imaginary drivers by the forward reference model at first IDOI calculator 40. The operational input of the imaginary drivers to be computed is first imaginary driver operational input Oid_1 to be computed based on the relative relationship between lane markers and the subject vehicle. At this point, three imaginary drivers (A, B, and C) are established having the respective driving intentions of lane keeping (LK), right lane changing (LCR), and left lane changing (LCL). Then the processor computes the required operational input Oid_1 enabling each imaginary driver to execute the respective driving intention. Steering angle $\theta id\_1$ of steering operations to be performed by the imaginary drivers is computed as operational input Oid_1. The following describes the method of calculating operational input Oid_1 for the imaginary drivers.

(1) First imaginary driver A having the intention of lane keeping (LK):

To compute steering angle θid for first imaginary driver A, the processor first sets forward reference point LK(i) when the driving intention of the imaginary driver is lane keeping, and it computes lateral position p_lk of forward reference point LK(i). The number of forward reference points LK(i) is discretionary, but this description uses as an example set forward reference points LK1 and LK2 along the forward direction centerline of the subject vehicle. As shown in FIG. 4, distance px(i) is set for the distances between the vehicle center point 0 and forward reference points LK1 and LK2, which in this example px(1)=10 m and px(2)=30 m. Distance px(i) can also be set by other factors such as subject vehicle speed.

A lateral distance lat_pos(px(i)) of the reference point LK(i) from the centerline of the lane is dependent on, and thus determined by, the yaw angle PSI and the distance px(i), which may be, for example, provided by processing the acquired image from the camera. Thus, the lateral position p_lk(px(i) of the reference point LK(i) may be expressed as:

$$p\_lk(px(i)=lat\_pos(px(i))\ i=\{1,\ldots,n\} \quad \text{Formula 1:}$$

The number n is equal to 2 (n=2) in the example shown in FIG. 4.

Using the lateral position p_lk(px(i)), the steering angle θid_lk may be expressed as:

$$\theta id\_1\_lk=\Sigma\{a(i)*p\_lk(px(i))\} \text{ (*means multiplication)} \quad \text{Formula 2:}$$

where: a(i) is an appropriately determined coefficient weighting the lateral position p_lk(px(i)) and is determined based on characteristics of the vehicle, such as the gear ratio.

(2) First imaginary driver B having the intention of lane changing to the right (LCR):

To calculate a steering angle θid_lcr, by which the second imaginary driver manipulates a steering wheel as directed by the intention of lane changing to the right (LCR), the processor sets at least one reference point LCR(i), which includes any desired number of reference points LCR(i). In this example, as shown in FIG. 4, two reference points LCR(1) and LCR(2) are set.

A lateral position p_lcr(px(i)) of the reference point LCR(i) may be given as a sum of lat_pos(px(i)) and a predetermined offset lc_offset_lcr, and thus expressed as:

$$p\_lcr(px(i)=lat\_pos(px(i))+lc\_offset\_lcr\ i=\{1,\ldots,n\} \quad \text{Formula 3:}$$

The number n is equal to 2 (n=2) in the example shown in FIG. 4. The predetermined offset lc_offset_lcr is an appropriately determined value for giving the lateral position p_lcr(px(i)) of the reference point LCR(i). In this example, the offset lc_offset_lcr is equal to −1.75 (lc_offset_lcr=−1.75).

Using the lateral position p_lcr(px(i)), the steering angle θid_lcr may be expressed as:

$$\theta id\_1\_lcr=\Sigma\{a(i)*p\_lcr(px(i))\} \quad \text{Formula 4:}$$

where: a(i) is an appropriately determined coefficient weighting the lateral position p_lcr(px(i)) and is determined based on characteristics of vehicle, such as the gear ratio of a vehicle implementing the system disclosed herein.

(3) First imaginary driver C having the intention of lane changing to the left (LCL):

To calculate a steering angle θid_lcl, the imaginary driver C manipulates a steering wheel as directed by the intention of lane changing to the left (LCR), the processor sets at least one reference point LCL(i), which includes any desired number of reference points LCL(i). In this example, as shown in FIG. 4, two reference points LCL(1) and LCL(2) are set.

A lateral position p_lcl(px(i)) of the reference point LCL(i) may be given by a sum of lat-pos(px(i)) and a predetermined offset lc_offset_lcl, and thus expressed as:

$$p\_lcl(px(i))=lat\_pos(px(i))+lc\_offset\_lcl\ i=\{1,\ldots,n\} \quad \text{Formula 5:}$$

The number n is equal to 2 (n=2) in the example shown in FIG. 3. The predetermined offset lc_offset_lcl is an appropriately determined value for giving the lateral position p_lcl(px(i)) of the reference point LCL(i). In this example, the offset lc_offset_lcl is equal to 1.75 (lc_offset_lcr=1.75).

Using the lateral position p_lcl(px(i)), the steering angle θid_lcl may be expressed as:

$$\theta id\_1\_lcl=\Sigma\{a(i)*p\_lcl(px(i))\} \quad \text{Formula 6:}$$

where: a(i) is an appropriately determined coefficient weighting the lateral position p_lcl(px(i)) and is determined based on characteristics of the vehicle, such as the gear ratio.

At Step S104 the operational input similarity Pid_1 is computed for the first imaginary driver by using operational input Ord of the real driver detected at Step S102 and operational inputs Oid_1 of first imaginary drivers for each driving intention computed at Step S103.

At this point, to facilitate description, collected similarity Pid_1_lk, Pid_1_lcr Pid—1_lcl are expressed by Pid_for instances in which driving intentions are for lane keeping, lane changing right, and lane changing left. In the same way, collected steering angle θid_1_lk, θid_1_lcr, θid_1_lcl are expressed by θid_1 for instances in which driving intentions are for lane keeping, lane changing right, and lane changing left.

The similarity Pid of each imaginary driver may be computed using a logarithmic probability of a normalized value of the imaginary driver's steering angle θid relative to a normal distribution, where the mean (e) is the real driver's steering angle θrd and the variance (σ) is a predetermined value ρrd such as a standard deviation of steering angles.

The similarity Pid may be expressed as:

$$Pid\_1=\log\{Probn[(\theta id\_1-\theta rd)/\rho rd]\} \quad \text{Formula 7:}$$

where: Probn is a probability density function used to calculate a probability with which a given sample is observed from a population expressed by the normal distribution.

Using the equation Formula 7 at Step S104, the processor computes a similarity Pid_lk for lane-keeping (LK), a similarity Pid_lcr for lane changing right (LCR), and a similarity Pid_lcl for lane changing left (LCL). These similarities Pid_1_lk, Pid_1_lcr, Pid_1_lcl are expressed as Pid_(t) because this is the first imaginary driver operational input degree of similarity at current time t.

At Step S105, the processor computes the operational input for multiple imaginary drivers according to the forward reference model in second imaginary driver operation calculator 60. At this point, the operational input of the computed imaginary driver is made second imaginary driver operational input Oid_2 and is computed based on the relative relationship of the subject vehicle to the preceding vehicle. At this point, the processor sets multiple imaginary drivers having driving intentions for lane keeping (LK) and for lane changing (LC), and the required operational input Oid_2 is computed to enable each imaginary driver to execute the respective driving intention. The following describes the calculation for second imaginary driver operational input Oid_2.

Figure 5:
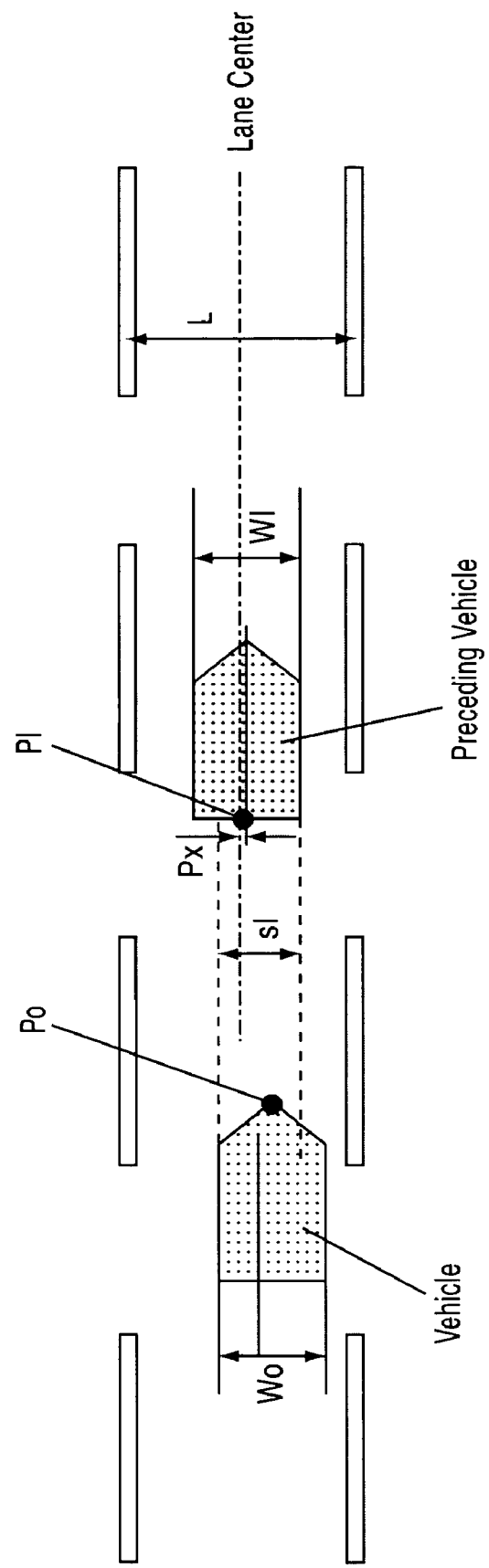
FIG. 5 is a diagram showing the relative positional relationship between the subject vehicle and a preceding vehicle.

(1) Second imaginary driver A having the intention of lane keeping (LK):

When performing lane keeping based on the relative relationship between the vehicle and the preceding vehicle, it is presumed that the subject vehicle will perform driving operations in a way that does not deviate in the lateral direction from the preceding vehicle. Correspondingly, the processor computes the lateral direction duplication rate (wrap rate) between the subject vehicle and the preceding vehicle. FIG. 5 shows the calculation for wrap rate S.

Wrap rate S is the value shown for overlap of preceding vehicle width Wl and subject vehicle width Wo. As shown in FIG. 5, the processor computes overlap sl for the overlap of preceding vehicle width Wl and subject vehicle width Wo, and it computes ratio sx of overlap amount sl in relation to preceding vehicle width Wl using the following Formula 8.

$$sx = sl/Wl \qquad \text{Formula 8:}$$

The processor computes wrap rate S from the following Formula 9 by using ratio sx.

$$S = sgn(dx) \times (sx) \qquad \text{Formula 9:}$$

In Formula 9, dx is the value showing the offset direction between the subject vehicle center position and the vehicle weight center position for the preceding vehicle. As shown in FIG. 5, dx=+1 when the vehicle width center position Po at the front end of the subject vehicle is offset to the right in relation to vehicle width center position Pl at the rear end of the preceding vehicle, and dx=−1 when the offset is to the left; sgn (dx) shows +1 when dx=+1 and shows −1 when dx=−1.

Accordingly, wrap ratio S becomes S=1 when there is complete overlap between the subject vehicle and the preceding vehicle, and a smaller value is expressed to the extent that overlap is smaller; the value is positive when the offset is disposed right for the subject vehicle and is negative when the offset is disposed left.

Next, the processor sets the second imaginary driver operational input Oid_2 so that wrap ratio S between the subject vehicle and the preceding vehicle is at maximum; specifically wrap ratio S=1. It sets wrap ratio S=1 as target wrap ratio Sd, and computes deviation e(t) between actual wrap ratio S and the target wrap ratio Sd as shown in Formula 10. Deviation e(t) is expressed as elk(t) when lane keeping.

$$elk(t) = Sd - |S| \qquad \text{Formula 10:}$$

Using deviation elk(t) computed by Formula 10 and the prior cycle deviation elk(t−1), the processor computes time deviation Δelk(t) for the target wrap ratio Sd as follows.

$$\Delta elk(t) = elk(t) - elk(t-1) \qquad \text{Formula 11:}$$

Next, using the time deviation Δelk(t) computed by Formula 11, the processor computes steering angle θid_2_lk(t) for the second imaginary driver for cases of lane keeping as follows.

$$\theta id\_2\_lk(t) = Kslk/(1+Tslk)*\{Kplk*\Delta elk(t)+Kdlk(\Delta elk(t)-\Delta elk(t-1))\} \qquad \text{Formula 12:}$$

where: Kslk is the steering gain, Tslk is the ineffective time constant, Kplk is the proportional coefficient, and Kdlk is the differential coefficient All of these parameters can be set discretionarily.

(2) Second imaginary driver B having the intention of lane changing right (LCR):

When lane changing, the processor sets as subject vehicle target lateral position Po the position offset by one entire lane width, 3.5 m for example, in the lateral direction from preceding vehicle lateral position Px, and then it computes the second imaginary driver operational input Oid_2. It computes deviation e(t) between lane lateral position x and target lateral position Po of the subject vehicle as follows. This expresses deviation e(t) as elc(t) when lane changing.

$$elc(t) = |Po| - |x| \qquad \text{Formula 13:}$$

Using deviation elc(t) computed by Formula 13 and prior cycle deviation elc(t−1), the processor computes time deviation Δe(t) for target lateral position Po as follows. This expresses time deviation Δe(t) as Δelc(t) when lane changing.

$$\Delta elc(t) = elc(t) - elc(t-1) \qquad \text{Formula 14:}$$

Next, using time deviation Δelc(t) computed by Formula 14, the processor computes steering angle θid_2_lc(t) for the second imaginary driver when lane changing as shown by Formula 15.

$$\theta id\_2\_lc(t) = Kslc/(1+Tslc)*\{Kplc \times \Delta elc(t)+Kdlc(\Delta elc(t)-\Delta elc(t-1))\} \qquad \text{Formula 15:}$$

where: Kslc is steering gain, Tslc is ineffective time constant, Kplk is proportional coefficient, and Kdlk is differential coefficient. All these parameters can be set discretionarily.

At Step S106, using the operational input Ord of the real driver, detected at Step S102, and operational input Oid_2 of the second imaginary driver for each driving intention computed at Step S105, the processor computes the amount similarity Pid_2 for the second imaginary drivers. At this point, in the same way as described with regard to the first imaginary driver operational input similarity Pid_1, the processor computes similarities Pid_2_lk, Pid_2_lc for driving intentions for both lane keeping and lane changing by using Formula 7. The similarity Pid_2_lk, Pid_2_lc are the second imaginary driver operation similarities at current time t, so this is shown as Pid_2(t) in the following method or process.

At Step S107, the processor determines proximity factor L between the subject vehicle and the preceding vehicle. Proximity factor L is, for example, the spacing between the subject vehicle and the preceding vehicle. When vehicle spacing is relatively great, the real driver can be considered to be driving by the standard of the forward reference point, which has the target position in front of the subject vehicle. On the other hand, when proximity factor L is small, the driver can be considered driving by the standard of the relative relationship to the preceding vehicle, because perceiving the forward reference point would be difficult.

At that point, when spacing distance L is greater than predetermined value Lo, the process advances to Step S108, and using first imaginary driver operational input similarity Pid_1 based on the forward reference model, the processor computes the collective operational input similarity Pids from the current time until a predetermined time in the past. On the other hand, when the vehicle spacing distance L is less than predetermined value Lo, the process advances to Step S109, and using the second imaginary driver operational input similarity Pid_2 based on the preceding vehicle reference model, the processor computes the collective operational input similarity Pids.

Figure 6:
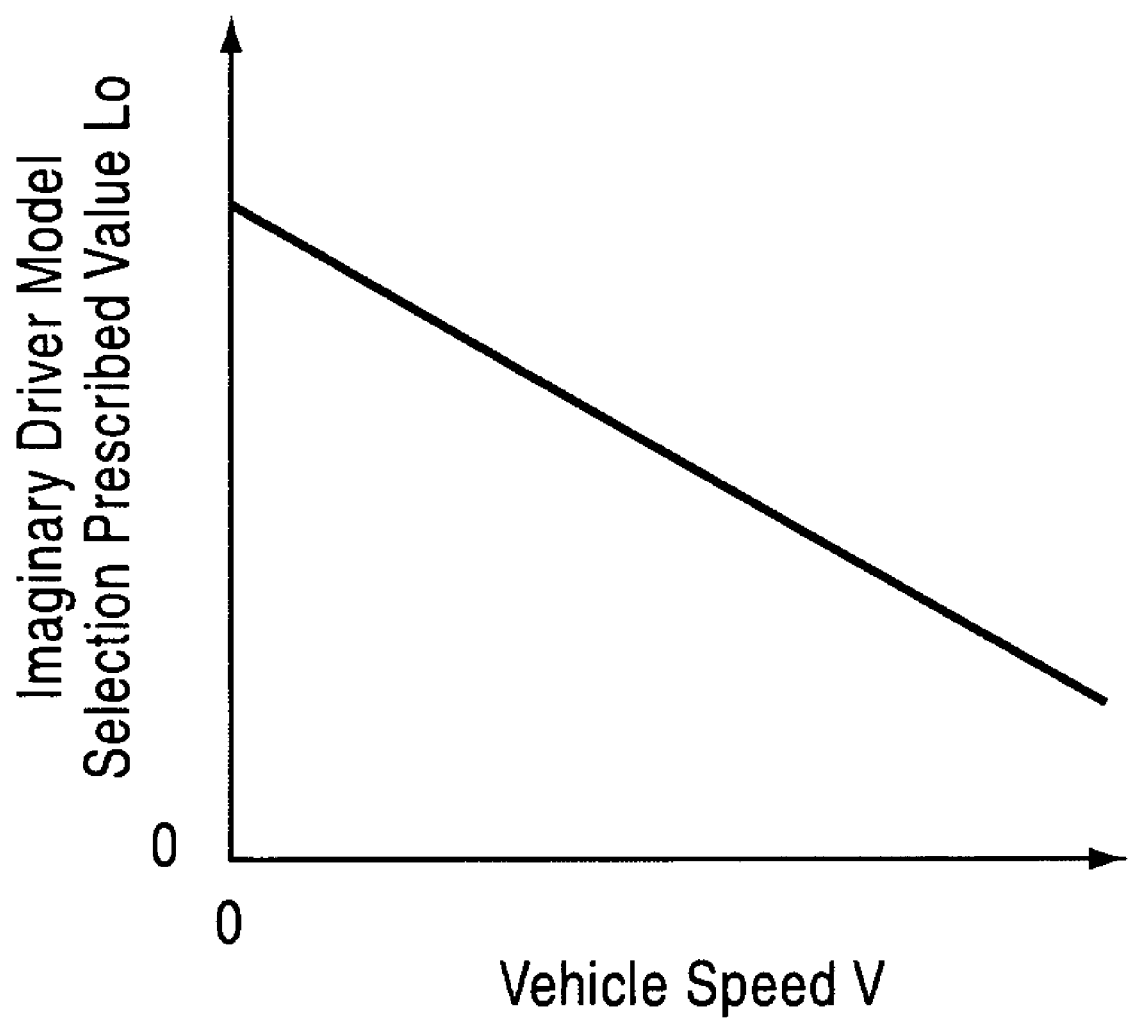
FIG. 6 is a graph showing the relationship between the speed of the subject vehicle and an imaginary driver model selection predetermined value.

The predetermined value Lo, which is the threshold value for deciding which imaginary driver to select based on vehicle spacing distance L, is variably set based on vehicle speed V detected by vehicle conditions detector 30. FIG. 6 illustrates the relationship between vehicle speed and predetermined value Lo. As shown in FIG. 6, predetermined value Lo is set to become smaller to the extent that vehicle speed becomes greater. From this, the frequency becomes higher for selecting first imaginary driver operational input similarity Pid_1, based on the forward reference model, to the extent that vehicle speed V becomes greater.

The following describes the computational method used at Step S108 for collective operational input similarity Pids. At this point, computation is made from a point of time in the past (t-m+1) until the current time t, and using the first imaginary driver operational input similarity Pid_1 of item m stored in the memory of the first IDOI calculator 40, the processor computes the operational input collective similarity Pids for each driving intention. At this point, the collected operational input collective similarity Pids_lk, Pids_lcr, Pids_lcl of driving intentions for lane keeping, lane changing right, or lane changing left, are expressed as Pids. The operational input collective similarity Pids can be computed as follows.

$$P_{ids} = \prod_{i=1}^{m} Pid(t - i + 1) \qquad \text{Formula 16}$$

where: the symbol Π expresses the product computed by all factors from current time t first driver operational input similarity Pid_1(t) until past time (t-m+1) imaginary driver operational input similarity Pid_(t-m+1).

Figure 7:
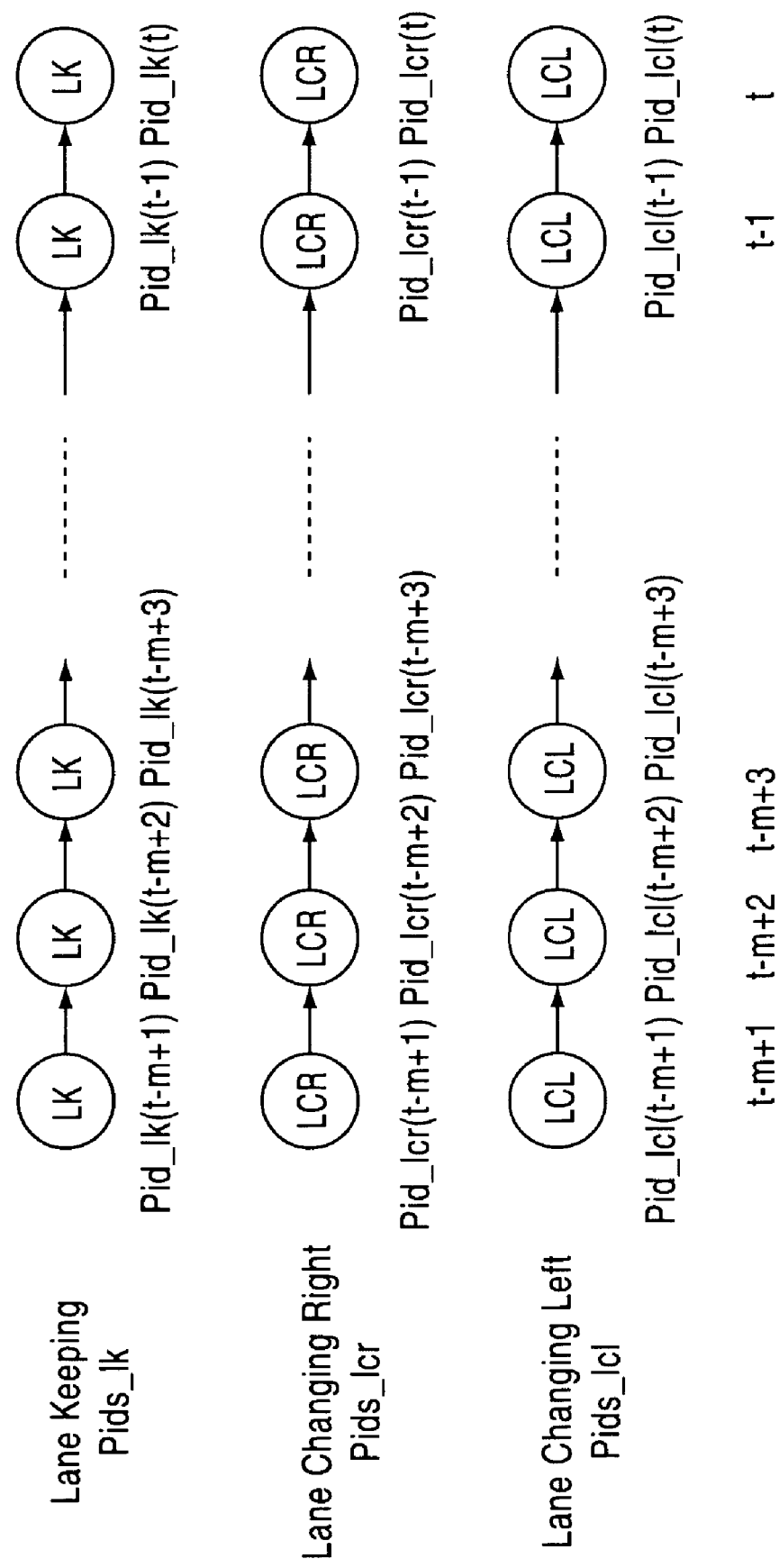
FIG. 7 is a representation of a computational method for an imaginary driver operational input collective approximation degrade.

Furthermore, as shown in FIG. 7, when the processor computes the operational input collective similarity Pid_lk for lane keeping, it uses similarity Pid_1_lk(t) to Pid_1_lk(t-m+1) of the lane keeping computed between the current time t to a point in time past (t-m +1). In the same way, when the processor computes the operational input collective similarity Pids_lcr lane changing right, it uses similarity Pid_1_lcr (t) to Pid_1_lcr(t-m+1) of lane changing right computed between the current time t to the point in time past (t-m +1), and it uses similarity Pid_1_lcl(t) to Pid_1_lcl(t-m+1) of lane changing left computed for the same period.

In this way, by using Formula 16 at Step S108, either the operational input collective similarity Pids_lk for lane keeping or the operational input collective similarity Pids_lcr for lane changing right or the operational input collective similarity Pids_lcl for lane changing left is computed based on a first imaginary driver. At this point, as shown in formula 17, the maximum value for collective similarity Pids_lcr during lane changing right or for collective similarity Pids_lcl during lane changing left is set as the collective similarity Pids_lc for lane changing.

$$Pids\_lc = \max\{Pids\_lcr, Pids\_lcl\} \qquad \text{Formula 17}$$

In the same way, using Formula 16 at Step S109, the processor computes operational input collective similarity Pids_lk for lane keeping or operational input collective similarity Pids_lc for lane changing based on the second imaginary driver.

Furthermore, the collective similarity Pids_lk for lane keeping expresses the likelihood (lane keeping likelihood Pr (LK)) for lane keeping by the real driver, and the collective similarity Pids_lc for lane changing expresses the likelihood (lane changing likelihood Pr (LC)) for lane changing by the real driver. After computing the driving intention likelihood of the real driver, the method or process advances to Step S110.

At Step S110, this system estimates the driving intention of the real driver. First, using the lane keeping likelihood Pr(LK) or lane changing likelihood Pr(LC) computed by Step S108 or S109, the processor computes the lane changing intention score Sc as follows.

$$S_c = \frac{\log P_r(LK)}{\log P_r(LC) + \log P_r(LK)} \qquad \text{Formula 18}$$

The lane changing intention score Sc computed by Formula 18 fluctuates continually between 0 and 1, and the value is made a larger value to the relative extent that the certainty (probability) of lane changing is larger than the certainty for lane keeping. For example, when the certainty of lane changing and lane keeping is 50:50, the resulting score is Sc=0.5, and when the certainty of lane changing is 100%, the resulting score is Sc=1.

Next, the system compares lane changing intention score Sc to lane changing intention estimation threshold T. Lane changing intention estimation threshold T is a predetermined value set appropriately in advance, for example with the setting T=0.5. When score Sc is larger than lane changing intention estimation threshold T, it is estimated as a driving intention for lane changing, and when score Sc is less than lane changing intention estimation threshold T, it is estimated as a driving intention for lane keeping.

At Step S111, the system produces as an output the estimation result for the driving intention of the real driver estimated at Step S110. This action completes the current method or process.

The thus-described first embodiment is capable of providing the following operational effects.

(1) The first IDOI calculator 40, for multiple differing imaginary drivers vested with driving intentions, computes required operational input Oid_1 in order that each imaginary driver can execute corresponding driving intention based on vehicle surroundings. The second IDOI calculator 60, based on information that differs from the vehicle surrounding conditions, by a second method or process that differs from the first method or process, computes the required operational input Oid_2 in order that multiple imaginary drivers invested with driving intentions can accomplish each corresponding driving intention. Imaginary driver model selector 80, based on running conditions of the subject vehicle, selects user operational input Oid_1 or Oid_2 for the imaginary driver. The driving intention estimator 90 estimates the driving intention of the real driver based on collective similarity Pids between the operational input Oid of the selected first imaginary driver and the operational input Ord of the real driver. In this way, according to the running conditions of the subject vehicle, it is possible to decide the operational input of the second imaginary driver based on the process used in deciding the operational input for the real driver, and this enables estimating driving intention with better accuracy.

(2) The first IDOI calculator 40, using the first process, computes the operational input Oid_1 of the imaginary driver using as a standard the target position set in the vehicle forward direction corresponding to driving intention. On the other hand, the second IDOI calculator 60, using the second method or process, computes the operational input Oid_2 of the imaginary driver based on the relative positional relationship between an obstacle existing in front of the vehicle and the subject vehicle. By computing the operational input Oid_1 and Oid_2 for imaginary drivers using different methods, it is possible to estimate driving intention with a higher degree of accuracy corresponding to the running conditions.

(3) The second IDOI calculator 60 computes the operational input Oid_2 of the second imaginary driver based on wrap ratio S representing the rates of overlap between subject vehicle width Wo and preceding vehicle width Wl as a relative relationship between the subject vehicle and an obstacle in the forward direction. In this way, when a preceding vehicle is present in the forward direction, the driving characteristics of the real driver are considered, which determines the operational input based on a standard of lateral direction overlap with the preceding vehicle, and this allows computation of operational input Oid_2 for the imaginary driver.

(4) Imaginary driver model selector 80 selects either the operational input Oid_1 or Oid_2 for the first imaginary driver or the second imaginary driver based on proximity to the preceding vehicle and on running conditions of the subject vehicle. Specifically, it selects operational input Oid_1 for the first imaginary driver when spacing distance L between the subject vehicle and the preceding vehicle is great, and it selects operational input Oid_2 for the second imaginary driver when spacing distance L is small. In this way this system considers the driving characteristics of the real driver, and this enables estimation of driving intention with better accuracy.

(5) Imaginary driver model selector 80, furthermore, selects either operational input Oid_1 or Oid_2 for the first or second imaginary driver based on vehicle speed V. Specifically, as shown in FIG. 6, it sets the threshold value Lo of the spacing distance L at the time of selection of the imaginary driver model to corresponding vehicle speed V. In this way, the operational input Oid_2 for the second imaginary driver is selected even if spacing distance L is large to the extent that vehicle speed is low, and this enables estimation of driving intention with better accuracy by considering driving characteristics of the real driver.

Second Embodiment

The basic structure of the driving intention estimation system according to a second embodiment is the same as that of the first embodiment, shown in FIG. 1. The following description sets forth the main points of difference from the first embodiment.

In the second embodiment, the system selects the imaginary driver model from either the forward reference model or the preceding vehicle reference model based on road curvature (turning curvature) $\rho$ of the road being traveled by the subject vehicle. In addition, when the subject vehicle is traveling through a curve, in order to activate the system's lateral direction analysis and modify estimation accuracy for the driving intention of the real driver, the system modifies lane change intention estimation threshold T based on turning curvature $\rho$.

In the second embodiment, vehicle surroundings detector 20 is complemented by a navigation system. The navigation system detects the current position of the subject vehicle by using a GPS signal receiver, and in addition it acquires road information from databases about turning curvature and other factors for the roadway being traveled.

Figure 8:
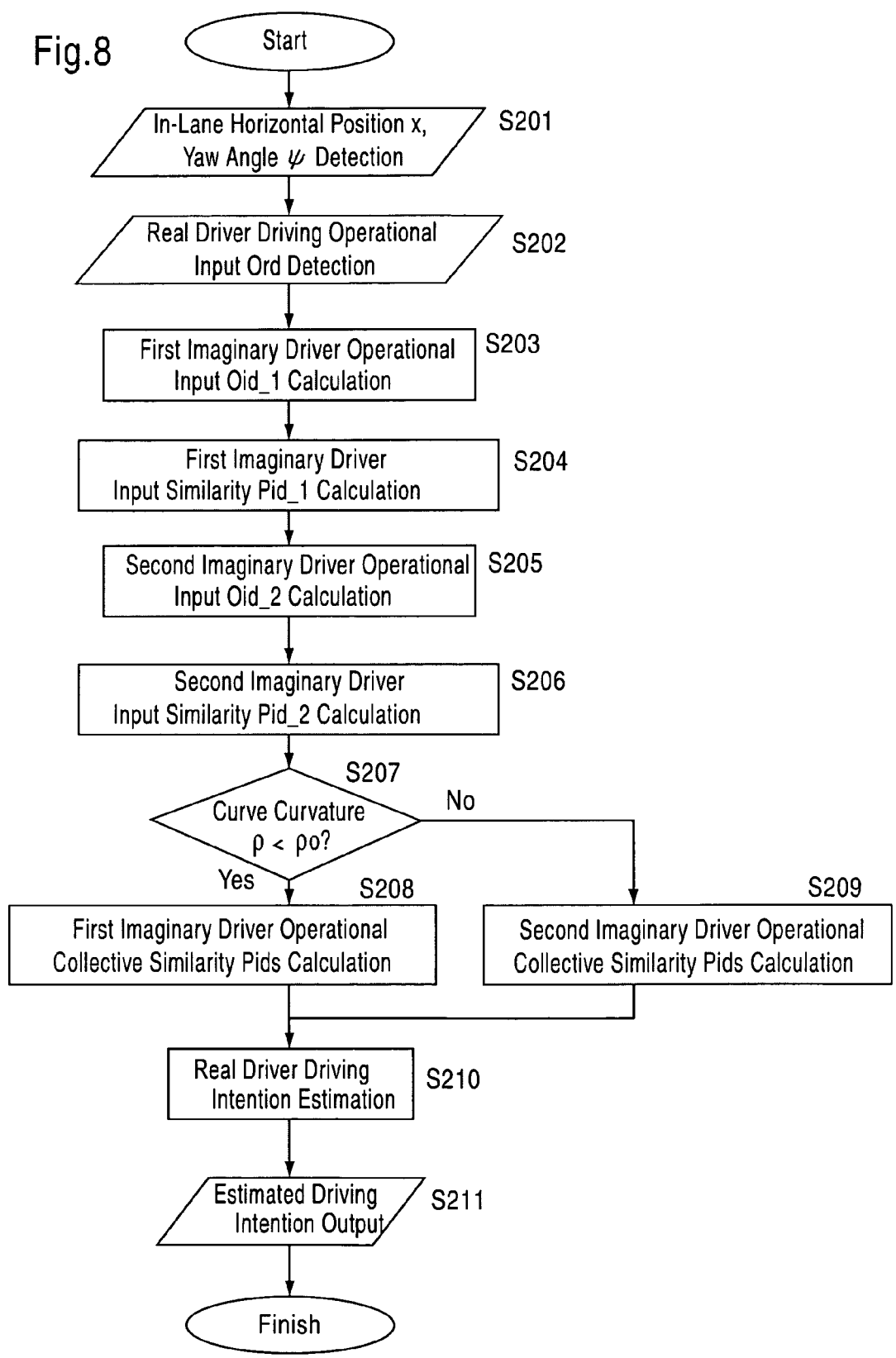
FIG. 8 is a flowchart illustrating a method or process for a driver's intention estimation system according to a second embodiment.

Details of the operation of the driving intention estimation system of the second embodiment are described with reference to FIG. 8, which is a flowchart showing the processing procedure of the driving intention estimation processing program in the estimation system. The method or process shown in FIG. 8 is performed continuously at a fixed time interval (for example, 50 msec). The process from steps S201 to 206 is the same as shown in FIG. 3 at Steps S101 S106, so that process is omitted from this description.

At Step S207, vehicle surroundings detector 20 acquires data from the navigation system, and determines turning curvature $\rho$ of the road being traveled by the subject vehicle. When turning curvature $\rho$ is smaller than predetermined value $\rho$o, namely when traveling through a wide curve, the process advances to Step S208, and the system uses operational input similarity Pid_1 of the first imaginary driver based on the forward reference model to compute the collective operational input similarity Pids from the current time to a predetermined past time. On the other hand, when turning curvature $\rho$ is greater than predetermined value $\rho$, namely when traveling through a sharp curve, the process advances to Step S209, and this system uses the operational input similarity Pid_2 for the second imaginary driver based on the preceding vehicle reference model to compute the collective operational input similarity Pids.

Figure 9:
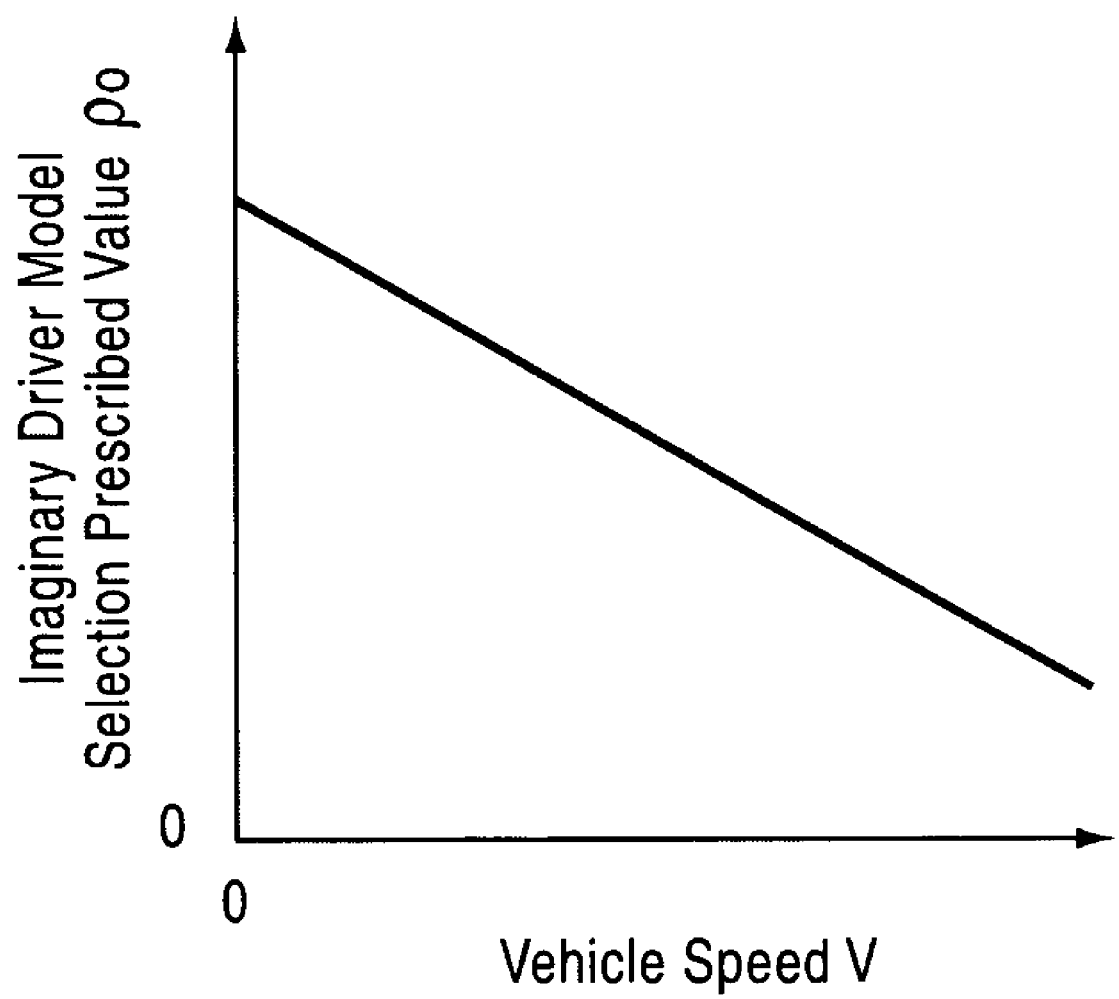
FIG. 9 is a graph showing the relationship between the speed of a subject vehicle and an imaginary driver model selection predetermined value.

Predetermined value $\rho$o, which is the threshold value for determining which imaginary driver is selected based on turning curvature $\rho$, can be variably set based on vehicle speed V detected by vehicle conditions detector 30. FIG. 9 shows the relationship between vehicle speed and predetermined value $\rho$o. As shown in the drawing, predetermined value $\rho$o is set to become smaller to the extent that vehicle speed V becomes greater. To the extent that vehicle speed V increases, this results in greater frequency for selecting operational input similarity Pid_1 of the first imaginary driver based on the forward reference model.

At Step S210, the processor uses the lane keeping likelihood Pr(LK) and the lane changing likelihood Pr(LC) computed by Step S208 or S209 to compute lane change intention score Sc as described above with reference to Formula 18. Then the system compares the computed lane change intention score with the lane change intention estimation threshold T. Lane change intention estimation threshold T is set based on turning curvature $\rho$ for the road being traveled by the vehicle. Specifically, to the extent that a curve is sharper, making turning curvature $\rho$ larger, estimation threshold T is set greater. This reduces the possibility of erroneous estimation of intention for lane changing when the driving intention of the real driver is for lane keeping. Estimation threshold T is set to a value such as $0.5 \leq T < 1$, in response to turning curvature $\rho$.

When score Sc is greater than the lane change intention estimation threshold T, the system estimates that driving intention is for lane changing, and when score Sc is less than threshold T, the system estimates the driving intention is for lane keeping. At Step S211 are produced as an output estimation results for the driving intention of the real driver as estimated at Step S210. This concludes the current method or process.

The thus-described second embodiment is capable of providing the following operational effects.

(1) Imaginary driver model selector 80 selects the operational input Oid_1 or Oid_2 for first or second imaginary driver based on turning curvature $\rho$ for the road being traveled and on the vehicle running condition. Specifically, when encountering a wide curve or a straight road, turning curvature $\rho$ becomes greater, and the system selects operational input Oid_1 of the first imaginary driver, and when encountering a sharp curve, turning curvature $\rho$ becomes smaller and the system selects operational input Oid_2 of the second imaginary driver. In this way, computation of operational input Oid_2 for the second imaginary driver is computed by a different method or process in conditions in which the accuracy of estimated driving intention would be decreased by the forward reference model (first method or process), and this enables estimation of driving intention with better accuracy. Imaginary driver model selector 80, as shown in FIG. 9, sets, according to the vehicle speed V, the threshold value $\rho$o of turning curvature ρ for the time of selecting the imaginary driver model. In this way, operational input Oid_2 of the second imaginary driver is selected even in wide curves when vehicle speed V is high, so this enables consideration of the driving characteristics of the real driver and enables estimation of driving intention with better accuracy.

(2) Lane change intention destination threshold T (driving intention estimation standard) used at the time of driving intention estimation is modified according to turning curvature ρ for the roadway. In this way, it is possible to reduce erroneous estimation of driver intention for the real driver when negotiating curves.

(3) Lane change intention estimation threshold T is set to become greater as turning curvature ρ becomes greater. In this way, it is possible to reduce erroneous estimation of lane keeping as lane changing when negotiating curves.

Third Embodiment

Figure 10:
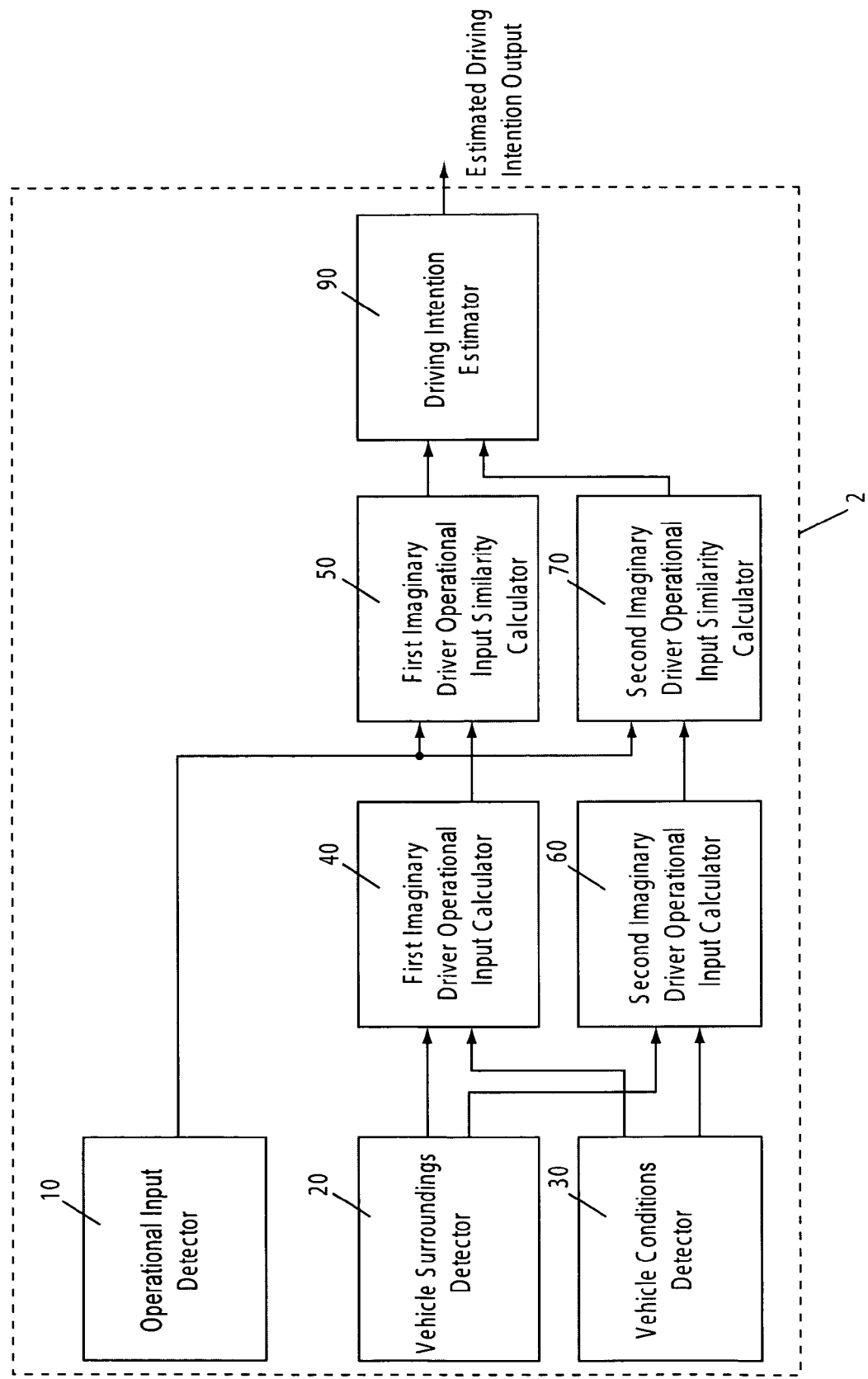
FIG. 10 is a block diagram of a driver's intention estimation system according to a third embodiment.

FIG. 10 shows the structure of driving intention estimation system 2 for according to a third embodiment. In FIG. 10, elements with functions identical to those of FIG. 1 are marked with identical characters. The following description sets forth the main differences from the first embodiment.

In the third embodiment, both the degree of similarity of driving operations between the real driver and the first imaginary driver based on the forward reference model and the degree of similarity of driving operations between the real driver and the second imaginary driver based on the preceding vehicle reference model are used for driving intention estimation. Accordingly, as shown in FIG 10, estimation system 2 of the third embodiment does not provide imaginary driver model selector 80.

Figure 11:
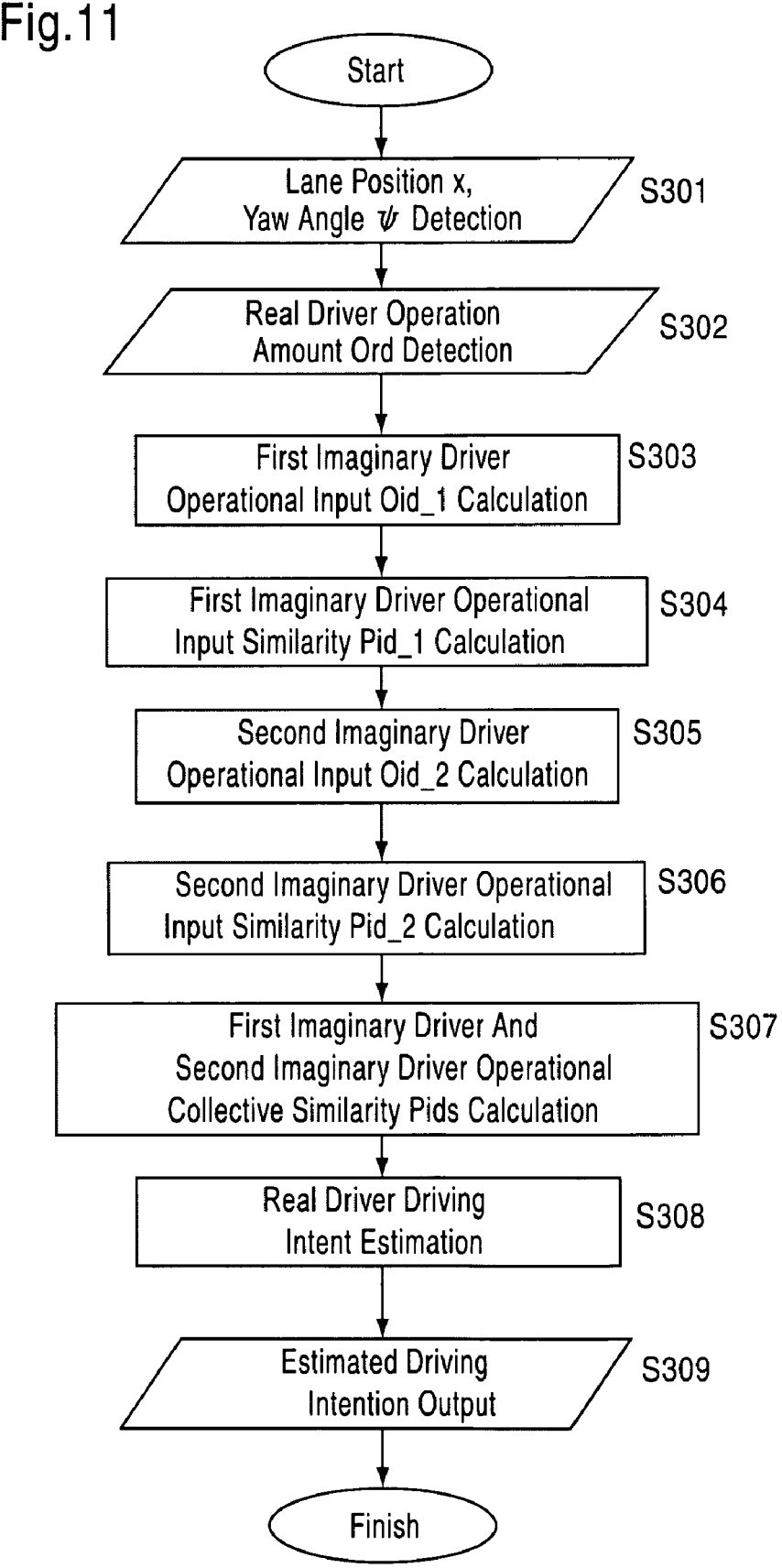
FIG. 11 is a flowchart illustrating the driver's intention estimation process of the embodiment of FIG. 10.

The following description of the operation of the third embodiment refers to FIG. 11, which is a flowchart showing the processing steps for the driving intention estimation processing program of the third embodiment. The processing content shown in FIG. 11 is performed continuously at fixed intervals (for example, 50 msec). Processing steps S301~S306 are identical to processing steps S101~S106 of FIG. 3, so they are omitted from this description.

In Step S307, the system uses operational input similarity Pid_1 of the first imaginary driver based on the forward reference model and operational input similarity Pid_2 of the second imaginary driver based on the preceding vehicle reference model to calculate each collective operational input similarity Pids_1 and Pids_2.

At Step S308, the system compares operational input collective similarity Pids_1 of the first imaginary driver and the operational input collective similarity Pids_2 of the second imaginary driver, and the similarity with the highest conformity to the operational input of the real driver, namely the operational input of the imaginary driver with the largest operational input collective similarity, is used as the estimation of the driving intention of the real driver.

At Step S309, the system produces as an output the estimation results for the driving intention of the real driver estimated by Step S308.

Furthermore, the system computes the lane change intention score Sc by using Formula 18 described above for the imaginary driver having the largest operational input collective similarity, which enables driving intention estimation.

The thus-described third embodiment is capable of providing the following operational effects. First IDOI calculator 40 computes the required first operational input Oid_1 in order that each imaginary driver can execute each corresponding driving intention based on the vehicle surroundings by using the first method or process for multiple differing imaginary drivers invested with driving intentions. The second IDOI calculator 60 computes the required second operational input of Oid_2 in order that multiple imaginary drivers invested with driving intentions can execute each corresponding driving intention by using a second method or process that differs from the first method or process based on information that differs from the vehicle surroundings used by the first IDOI calculator 40. The first IDOI similarity calculator 50 computes the degree of similarity between the first operational input Oid_1 and the operational input Ord of the real driver, and the second IDOI similarity calculator 70 computes the degree of similarity between the second operational input of Oid_2 and the operational input Ord of the real driver. Then driving intention estimator 90 estimates the driving intention of the real driver by using both the first and the second operational inputs Oid_1 and Oid_2. This enables estimation as the driving intention of the real driver the imaginary driver that most closely approximates the driving of the real driver from among the multiple imaginary drivers that have been generated by the multiple processes.

Fourth Embodiment

Figure 12:
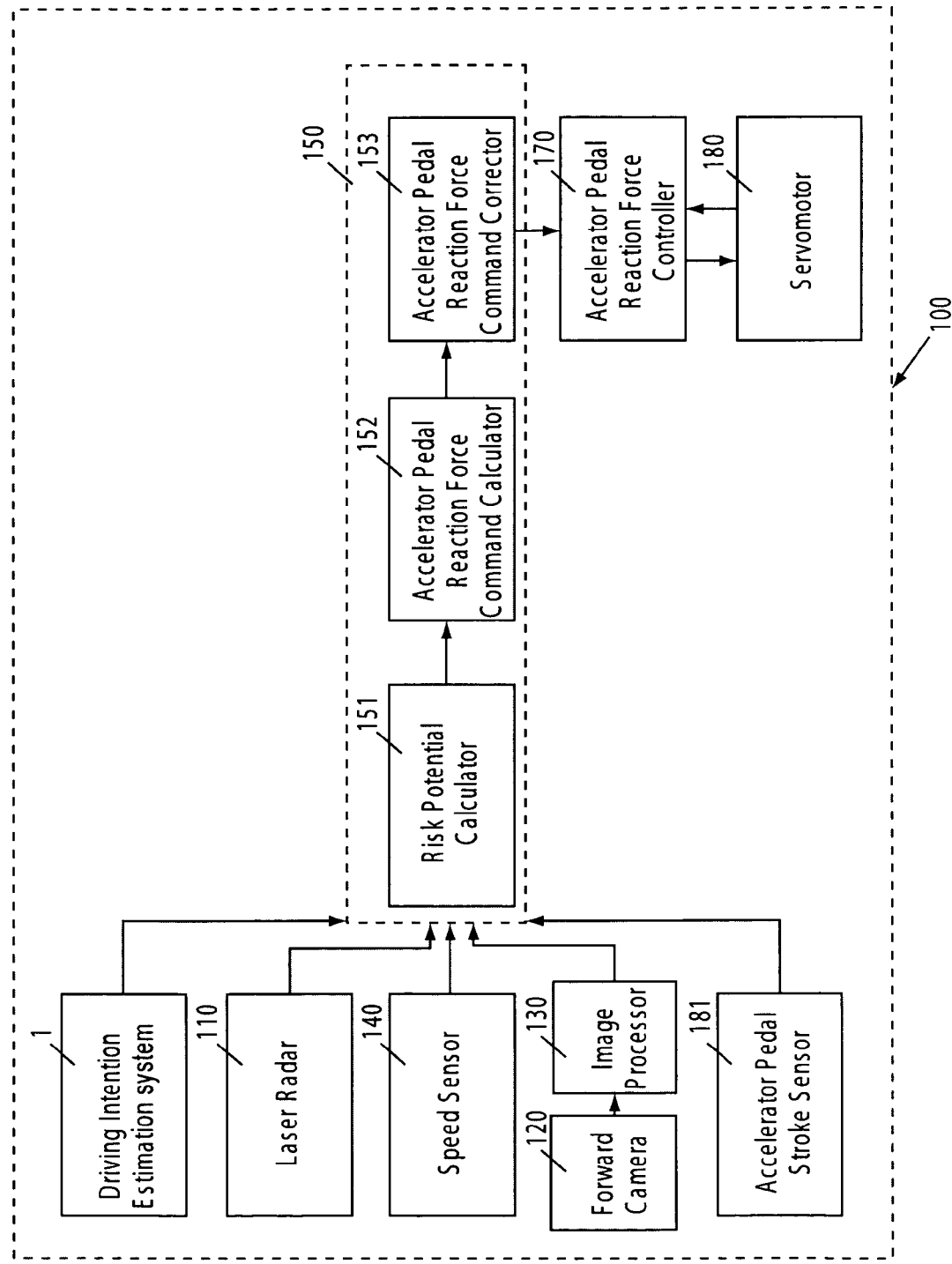
FIG. 12 is a block diagram showing a fourth embodiment comprising a vehicle operation assistance device.
Figure 13:
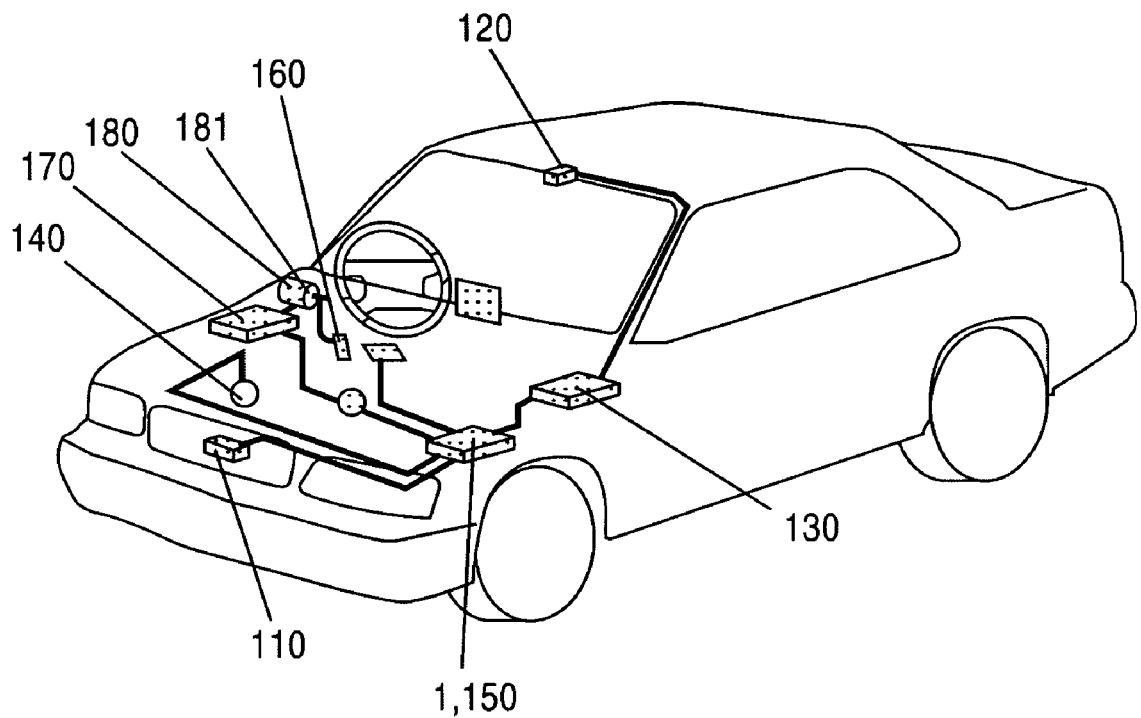
FIG. 13 is a diagrammatic perspective view of a vehicle equipped with the vehicle operation assistance device of FIG. 12.

FIG. 12 is a block diagram showing the configuration of a fourth embodiment in the form of a vehicle operation assistance system 100, and FIG. 13 is a structural drawing for a vehicle equipped with the vehicle operation assistance device 100. Driving assistance device 100 is a system that assists the real driver's operation based on driving intention estimation results of the driving intention estimation device 1 or 2 described in connection with the first and second embodiments.

Referring to FIGS. 12 and 13, the vehicle operation assistance system includes a laser radar 110. As shown in FIG. 13, the laser radar 110 is mounted to the vehicle on a front bumper or a front grill, and it monitors the region in front of the subject vehicle by emitting infrared pulses horizontally. Laser radar 110 measures the infrared pulse waves reflected back from any forward objects, such as a rear section of a preceding vehicle, and from the arrival time of the reflected waves it determines the distance to the preceding vehicle and its relative speed. The forward region scanned by laser radar 110 is an angle of about 6 degrees at the front of the vehicle, and it detects forward objects within this range.

Front camera 120 is of the charge-coupled device (CCD) type or complementary metal-oxide-semiconductor (CMOS) type and is mounted to the vehicle in the vicinity of the internal rear view mirror, as shown in FIG. 13, to acquire image data of a region in front of the vehicle. The front camera 120 transmits, as output signals, the acquired image data to an image processor 130. The image processor 130 provides the processed image data to the controller 150. The region covered by the front camera 120 extends from the camera axis to each side by about 30 degrees.

The vehicle operation assistance system also includes a vehicle speed sensor 140. The vehicle speed sensor 140 may determine vehicle speed of the host vehicle by processing outputs from wheel speed sensors.

Furthermore, the driving intention estimation results for the real driver estimated by driving intention estimation system 1 of the first or second embodiment described above is transmitted to controller 150. Moreover, it is also acceptable to use the estimation result of estimation system 2 of the third embodiment.

Controller 150 comprises CPU components such as a central processing unit (CPU), a read only memory (ROM), and a random access memory (RAM). It includes software implementation of a risk potential RP calculator 151, a reaction force command FA calculator 152 for applying a reaction force to the acceleration pedal, and a command FA corrector 153.

RP calculator 151 computes a risk potential RP for subject vehicle surroundings based on a vehicle speed input from laser radar 110 and speed sensor 140, spacing distance to a preceding vehicle and relative speed of the preceding vehicle, and image data for the vehicle surroundings received from image processor 130. Accelerator pedal reaction force command calculator 152 computes the command FA for accelerator pedal reaction force to be applied to accelerator pedal 160.

Based on driving intention estimation results received from driving intention estimation device 1, accelerator pedal reaction force command corrector 153 corrects the accelerator pedal reaction force command FA computed by accelerator pedal reaction force command calculator 152. The accelerator pedal reaction force command FA, corrected by accelerator pedal reaction force command corrector 153, is transmitted to accelerator pedal reaction force controller 170.

Figure 14:
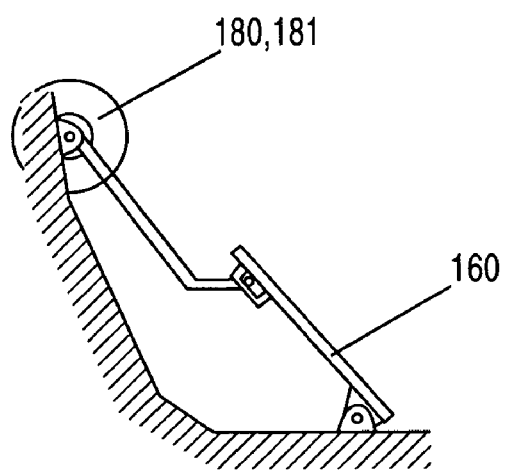
FIG. 14 is a side elevational view of an accelerator pedal and its surroundings.

Accelerator pedal reaction force controller 170 controls the accelerator pedal reaction force according to the command from controller 150. Servomotor 180 and stroke sensor 181 are connected to accelerator pedal 160 by a linkage mechanism (FIG. 14). Servomotor 180 controls torque and rotation angle according to commands from accelerator pedal reaction force controller 170, and the driver at his discretion controls the operational force to be applied in operation of accelerator pedal 160. Accelerator pedal stroke sensor 181 detects the stroke amount (operational input) AS of accelerator pedal 160 as converted to a rotation angle of servomotor 180 through the linkage mechanism.

In addition, normal accelerator pedal reaction force properties when not applying accelerator pedal reaction force control are set so that the accelerator pedal reaction force will increase linearly as the operational input AS increases, for example. Normal accelerator pedal reaction force properties can be achieved through spring force of a torsion spring (not depicted) disposed at the rotational axis of accelerator pedal 160.

Controller 150 controls the accelerator pedal reaction force generated to the accelerator pedal 160 based on risk potential RP of the subject vehicle, specifically the risk potential with regard to the preceding vehicle. At this point, when accelerator pedal reaction force is added in correspondence with an increase of risk potential RP at the time the driver approaches the preceding vehicle with an intention to change lanes, there is the possibility of protecting driver operation or imparting discomfort to the driver. Therefore, when a lane change intention is estimated by driving intention estimator 1, the accelerator pedal reaction force becomes smaller in comparison to the situation in which lane change intention is not estimated. Furthermore, when lane change intention is estimated by using the second imaginary driver based on the preceding vehicle reference model, the accelerator pedal reaction force is further adjusted.

Figure 15:
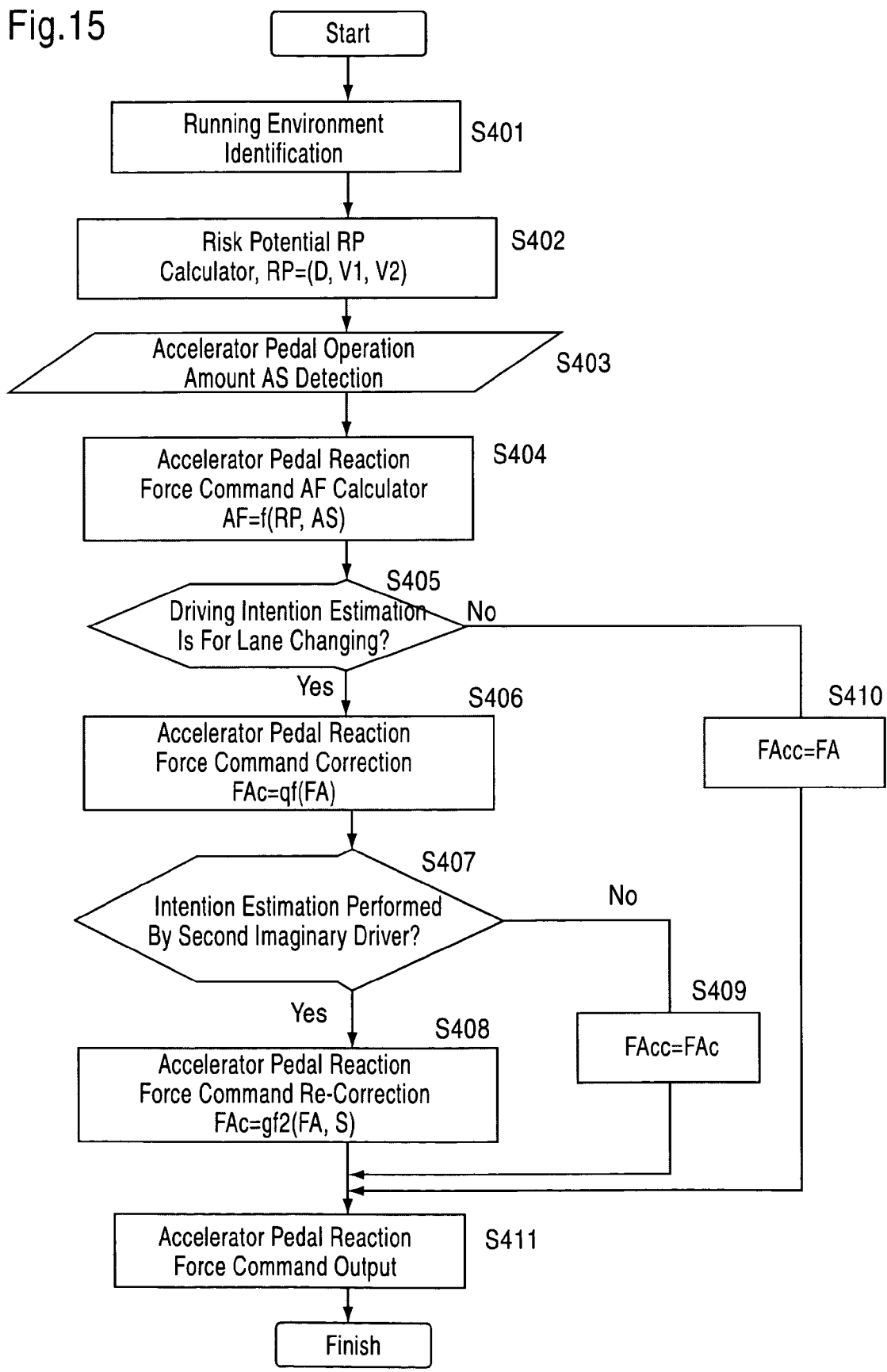
FIG. 15 is a flowchart illustrating the driver's assistance control process of the embodiment of FIGS. 12 to 14.

FIG. 15 is a flowchart that illustrates method or processing steps of a driver assisting control program stored in the controller 150. The execution of the control routine is performed continuously at regular intervals, for example, 50 msec.

At Step S401, the system reads environmental status showing the operating environment surrounding the subject vehicle as detected by laser radar 110, forward camera 120, and speed sensor 140. Specifically, it reads the spacing distance D between the subject vehicle and the preceding vehicle, the preceding vehicle speed V2 and the subject vehicle speed V1. At Step S402, the system computes the risk potential RP for the vehicle surroundings based on the running environment data read at Step S401. The system then computes time-to-contact TTC and time headway THW in order to compute risk potential RP for the vehicle surroundings.

Surplus time TTC is a physical quantity showing the proximity of the current subject vehicle in relation to the preceding vehicle. Surplus time TTC is a value showing whether the spacing distance will become zero with contact between the subject vehicle and the preceding vehicle after some seconds, if current conditions continue, when subject vehicle speed V1, preceding vehicle speed V2, and relative speed Vr are fixed (Vr=V2−V1). Surplus time TTC can be derived as follows.

$$TTC = -D/Vr \qquad \text{Formula 19:}$$

The smaller the value of TTC, the more imminent is the collision and the greater the proximity to the preceding vehicle. For example, at the time of approach to a preceding vehicle, most vehicle drivers perceive a high degree of risk and initiate deceleration to avoid collision well before the TTC becomes less than 4 seconds.

When a subject vehicle is properly operating behind a preceding vehicle, time headway THW is a physical quantity showing the degree of impact on surplus time TTC by possible future changes in preceding vehicle speed, which can be expressed as the projected degree of effect at change of relative speed Vr. The THW is expressed as follows.

$$THW = D/V1 \qquad \text{Formula 20:}$$

THW is a value that divides spacing distance D by vehicle speed V1, and it expresses the time required for the subject vehicle to reach the current position of the preceding vehicle. To the extent that THW becomes greater, the forecast effect related to surroundings becomes smaller. In other words, when THW is large, even if the speed of the preceding vehicle subsequently changes, it will not have a great effect on approach to the preceding vehicle, and TTC will not be greatly modified. In addition, when the subject vehicle is following the preceding vehicle and subject vehicle speed V1 equals preceding vehicle speed V2, THW can be computed by using preceding vehicle speed V2 as a substitute for subject vehicle speed V1 in Formula 20.

Controller 150 uses the computed TTC and THW to compute risk potential RP for the subject vehicle. Risk potential RP for the subject vehicle can be computed using Formula 21.

$$RP = a/THW + b/TTC \qquad \text{Formula 21:}$$

As shown in Formula 21, risk potential RP is a physical quantity continuously expressed by TTC and THW, where a and b are parameters weighting THW and TTC, respectively, to set the values appropriately in advance. Parameters a and b are set to, for example, a=1 and b=8 (a<b).

At Step S403, controller 150 reads operational input AS of accelerator pedal 160 detected by accelerator pedal stroke sensor 181. At Step S404, the system computes accelerator pedal reaction force command FA based on risk potential RP computed at Step S402. It computes reaction force complement ΔF in response to the risk potential RP.

Figure 16:
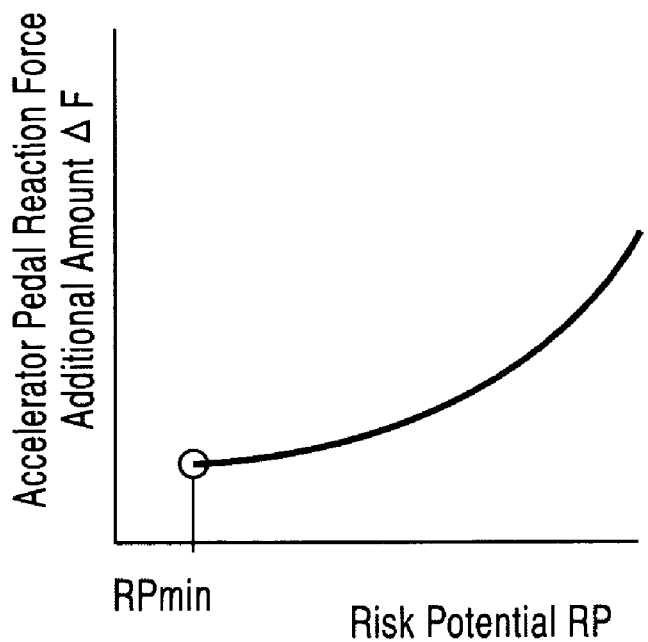
FIG. 16 is a graph showing the relationship between risk potential and an added reaction force.

The curve in FIG. 16 shows varying reaction force complement ΔF relative to risk potential RP for the subject vehicle. When the risk potential RP is smaller than a minimum value Rpmin, the reaction force complement ΔF is zero. This prevents presentation of unnecessary information to the driver when risk potential RP of the vehicle surroundings is unusually small. An appropriate value is predetermined as the minimum value Rpmin.

Within a region where the risk potential RP exceeds the minimum value Rpmin, the reaction force complement ΔF increases exponentially as the risk potential RP increases. The reaction force complement ΔF within this region may be expressed as shown in Formula 22:

$$\Delta F = k*RP^n \qquad \text{Formula 22:}$$

where: k and n are constants that are appropriately predetermined based on results obtained by drive simulator and site test to allow effective conversion of risk potential RP to the reaction force complement ΔF.

Additionally, controller 150 computes accelerator pedal reaction force command FA by adding the reaction force complement ΔF computed by Formula 22 to the ordinary reaction force property, in response to accelerator pedal operational input AS.

At Step S405, controller 150 determines whether or not the estimation result for driving intention from estimation system 1 is indicative of an intention to change lanes. When this is the case, the process advances to Step S406, at which controller 150 corrects the accelerator pedal reaction force command FA. Specifically, it executes filter processing of the accelerator pedal reaction force command FA computed at Step S404 through a low-pass filter, and causes attenuation.

The corrected value, accelerator pedal reaction force command FAc, may be expressed as follows.

$$FAc = gf(FA) = k*\{1/(1+a*Tsf)\}*FA \qquad \text{Formula 23:}$$

where: k and a are appropriately determined constants, and Tsf is the time constant at time of attenuation of reaction force command FA.

Continuing with Step S407, the system determines whether or not lane changing intention was estimated using the second imaginary driver based on the preceding vehicle reference model in estimation system 1. If determination at Step S407 is affirmative, the process advances to Step S408, and accelerator pedal reaction force command FA is corrected.

The following can be used to express the accelerator pedal reaction force command FAcc after the correction.

$$FAcc = gf2(FA,S) = k*\{1/(1+Kfdx*a*Tsf)\}*FA \qquad \text{Formula 24:}$$

Figure 17:
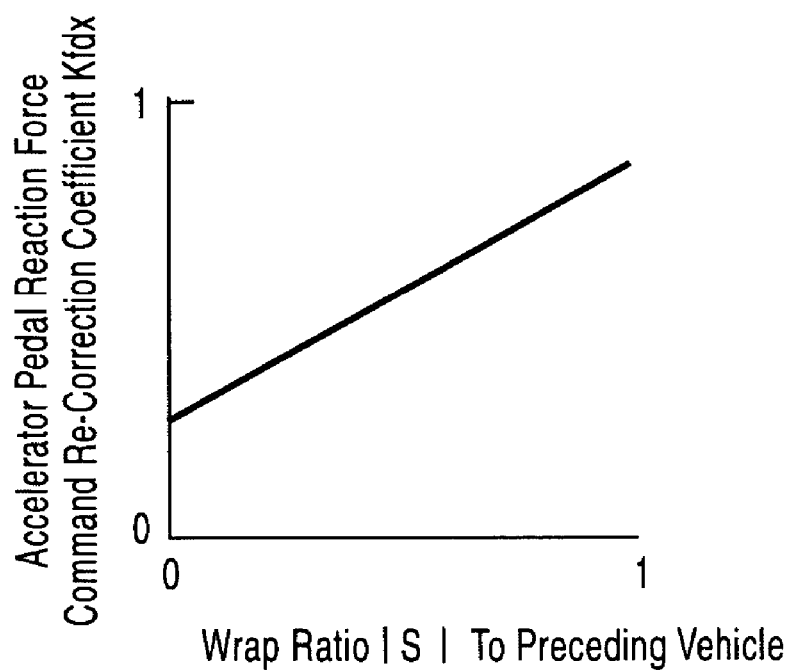
FIG. 17 is a graph showing the relationship between the vehicle and the route ratio using an accelerator pedal reaction force command correction.

The coefficient Kfdx related to that time constant Tsf is set corresponding to wrap ratio S of the preceding vehicle at the time estimation is performed for lane changing intention as shown in FIG. 17.

In FIG. 17, coefficient Kfdx related to time constant Tsf is between 0<Kfdx<1, and it is set to become smaller to the extent that resistance value |S| of the wrap ratio S of the preceding vehicle is smaller. In this way, to the extent that the resistance value of the wrap ratio S for the preceding vehicle at the time of lane changing intention estimation becomes smaller, the time value (Kfdx*a*Tsf) becomes smaller, and this allows a quick attenuation of the accelerator pedal reaction force. In addition, it is possible to directly set the time constant Tsf in correspondence with wrap ratio S of the preceding vehicle.

When Step S407 is determined to be negative, the system advances to Step S409, and correction value FAc, produced as an output at Step S406, is set as the modified correction value FAcc.

On the other hand, when it is determined at Step S405 that the driving intention estimated by estimation system 1 is for lane keeping, the process advances to Step S410, and the system sets the accelerator pedal reaction force command FA computed at Step S404 as the modified correction value FAcc without change.

At Step S411, the system transmits the accelerator pedal reaction force modified correction value FAcc computed by Step S408, S409, or S410 to accelerator pedal reaction force controller 170. Accelerator pedal reaction force controller 170 controls servomotor 180 according to the command input from controller 150. This concludes the current method or process.

The described fourth embodiment is capable of providing the following operational effects.

(1) Controller 150 computes the risk potential RP based on obstacle conditions in the subject vehicle surroundings, and it regulates accelerator pedal reaction force based on the computed risk potential RP. The controller 150 corrects the reaction force at the accelerator pedal 160 based on the estimation results from estimation system 1, making it possible to reflect the driver's intention in regulating the accelerator pedal reaction force while continuing to forward the risk potential RP of the vehicle surroundings to the driver by applying the reaction force of accelerator pedal 160, which is a vehicle operation device.

(2) Controller 150 corrects the operational force, namely accelerator pedal reaction force command FA, based on driving intention estimation results, and it also corrects accelerator pedal reaction force command FA based on wrap ratio S between the subject vehicle and the preceding vehicle when the estimation result of estimation system 1 is based on the second imaginary driver operational input Oid_2. This enables forwarding of risk potential RP for control of operational reaction force without inhibiting the driving intention of the real driver.

(3) Controller 150, when the driving intention estimation result is for a lane changing intention, corrects the accelerator pedal reaction force command value FA to become smaller in comparison to the situation in which there is no lane changing intention, and in addition it corrects the accelerator pedal reaction force command value FA to become even smaller to the extent that the duplication rate S it is small. In this way, the accelerator pedal reaction force command value FA is reduced when it is estimated that there is a lane changing intention, and the accelerator reaction force command value FA is further reduced in conditions forecasting execution of quick lane changing by the subject vehicle with a small wrap ratio S, so there is no inhibiting of driving operation when the driver is attempting to perform lane changing.

Furthermore, as described in connection with the second embodiment, when executing driving intention estimation by using the second imaginary driver based on the preceding vehicle reference model at the time of negotiating a curve, lane change estimation threshold T is made smaller to the extent that turning curvature ρ becomes smaller due to reduced estimation accuracy of driving intention. In this way, the frequency for generation of erroneous estimation for lane changing during lane keeping is reduced. However, when the estimation accuracy for lane changing intention is high, it delays the timing for estimation of the intention for lane changing. At this point, especially, when it is estimated that lane changing will occur by using the second imaginary driver model during driving through curves, the time value (Kfdx*a*Tsf) of Formula 24 is made smaller, and the accelerator pedal reaction force is quickly decreased, and this enables compensation for the delay in lane changing estimation timing.

Fifth Embodiment

Figure 18:
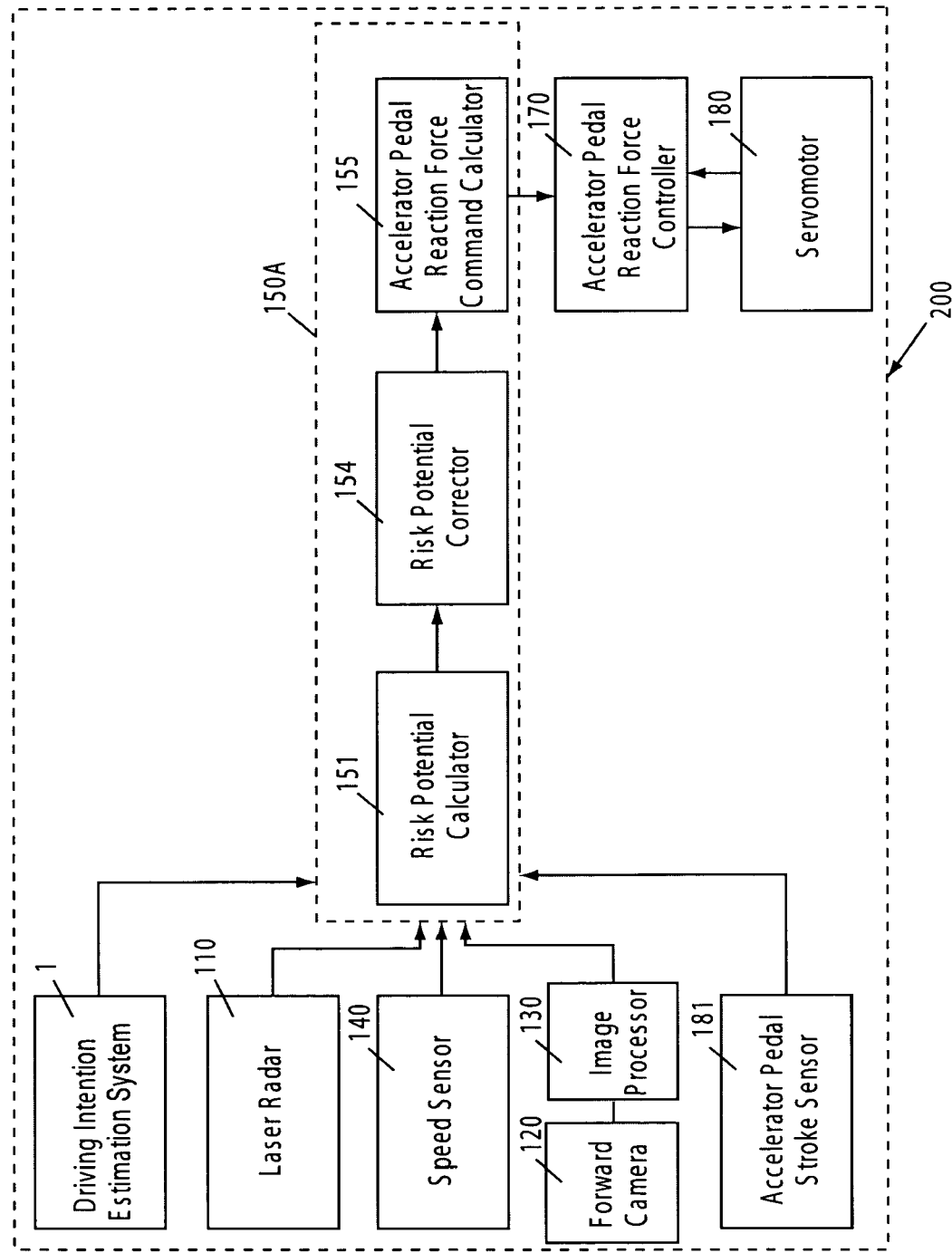
FIG. 18 is a block diagram showing the vehicle driving assistance device according to a fifth embodiment.

Referring to FIG. 18, another embodiment of a vehicle operation assistance system 200 according to the present disclosure is described. The vehicle operation assistance system 200 is substantially the same as the vehicle operation assistance system of the fourth embodiment, and like reference numerals are used to designate like parts or portions throughout FIGS. 12 to 18. However, the vehicle operation assistance system 200 is different from the vehicle operation assistance system of the fourth embodiment in the following respects:

With the vehicle operation assistance system of the fifth embodiment, when estimation system 1 estimates driver intention for lane changing, the vehicle operation assistance system 200 corrects risk potential RP. The vehicle operation assistance system 200 includes a controller 150A. Controller 150A is provided with a risk potential RP calculator 151, a risk potential corrector 154, and an accelerator pedal reaction force command FA calculator 155.

Figure 19:
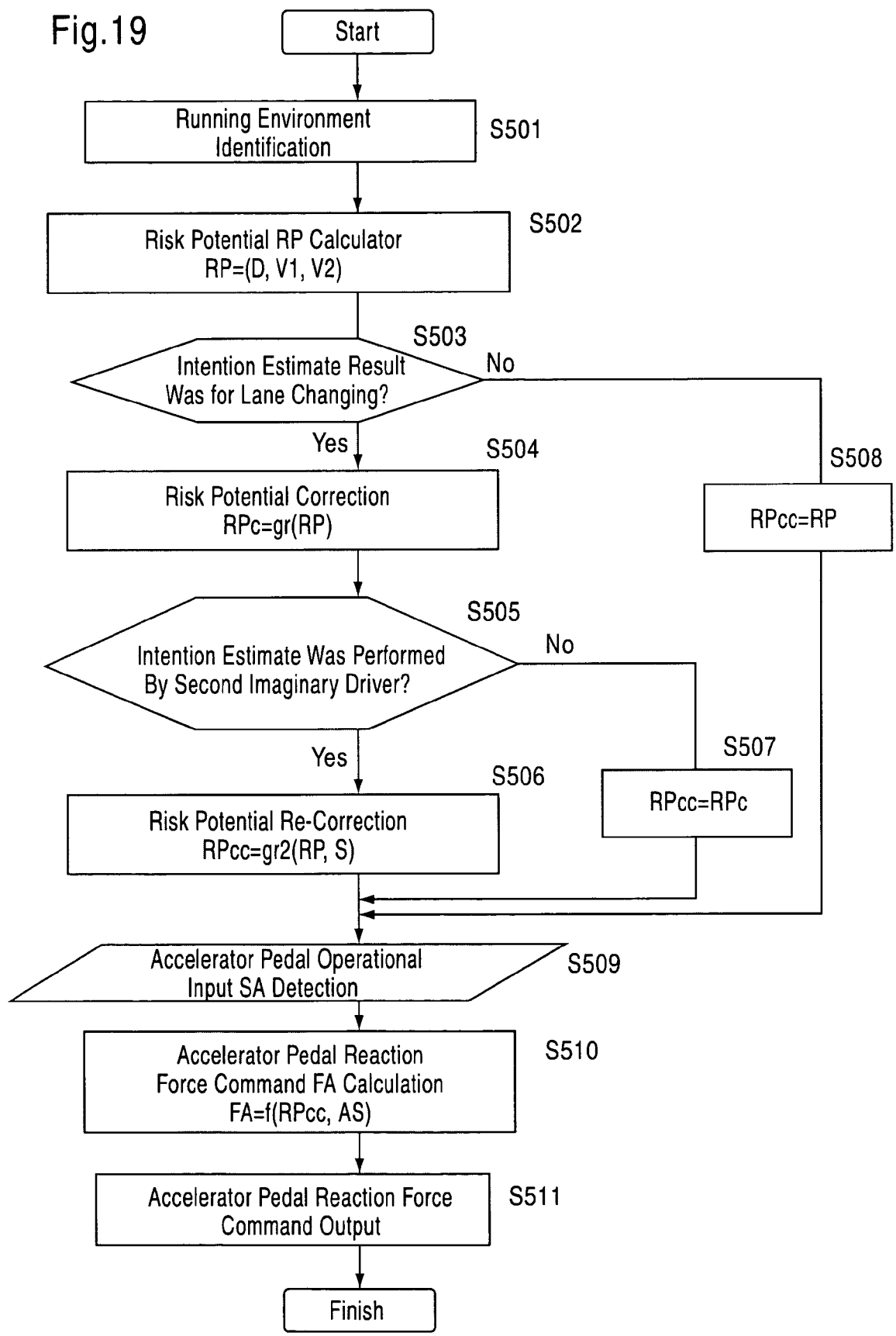
FIG. 19 is a flowchart illustrating the driving assistance control process of the embodiment of FIG. 18.

The flowchart in FIG. 19 illustrates the processing steps of a vehicle operations assistant control program stored in controller 150A. The execution of the processing routine is repeated at regular intervals of, for example, 50 msec. Steps S501 and S502 of the flowchart illustrated in FIG. 19 correspond to Steps S401 and S402 of the flowchart illustrated in FIG. 15, so those steps are omitted from the following description.

At Step S503, controller 150A reads the estimation results for driving intention from estimation system 1 and determines whether or not the results are for lane changing. When it is determined that driving intention has been estimated to be lane changing, the process advances to Step S504. At Step S504, controller 150A corrects risk potential RP computed at Step S502. Specifically, it executes filter processing for risk potential RP computed at Step S502 through a low-pass filter, and thus causes attenuation.

Risk potential RPc after correction can be a expressed as follows.

$$RPc = gr(RP) = k*\{1/(1+a*Tsr)\}*RP \qquad \text{Formula 25:}$$

where: k and a are values appropriately set, and Tsr is the time constant at the time that risk potential RP is attenuated.

Proceeding to Step S505, the system determines whether or not lane changing intention has been estimated using the second imaginary driver based on the preceding vehicle reference model by estimation system 1. If Step S505 is decided affirmatively, the process advances to Step S506 and risk potential RP is further corrected.

The risk potential RPcc after modified correction can be expressed by the following.

$$RPcc = gr2(RP,S) = k*\{1/(1+Krdx*a*Tsr)\}*RP \qquad \text{Formula 26:}$$

where: Coefficient Krdx related to time constant Tsr corresponds to wrap ratio S at the time of estimation of lane changing intention as shown in FIG. 20.

Figure 20:
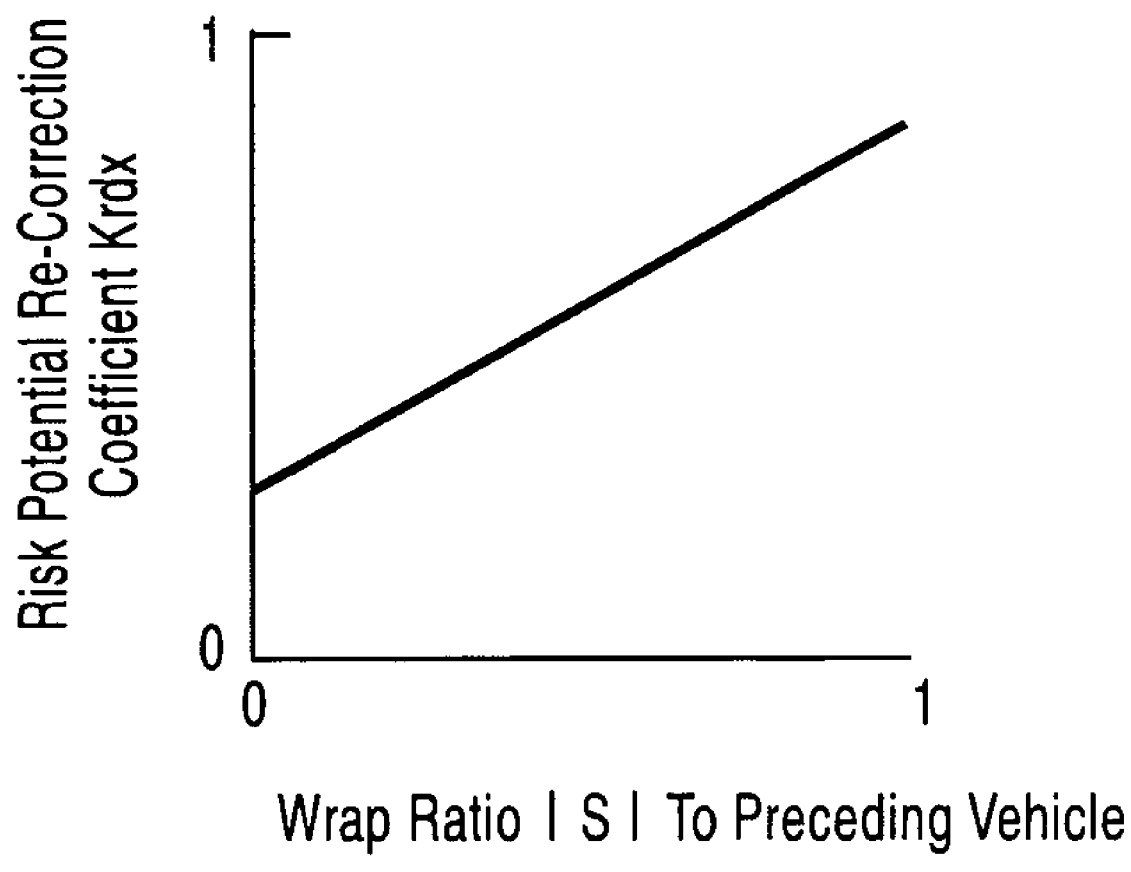
FIG. 20 is a graph showing the relationship between a preceding vehicle and the wrap ratio with vehicle fishing using a risk potential modified correction.

In FIG. 20, coefficient Kfdx related to time constant Tsf is between 0<Kfdx<1, and it is set to become smaller to the extent that resistance value |S| of wrap ratio S of the preceding vehicle is smaller. In this way, to the extent that the resistance value of wrap ratio S for the preceding vehicle at the time of lane changing intention estimation becomes smaller, that time constant (Kfdx*a*Tsf) becomes smaller, and this allows quick generation of accelerator pedal reaction force. In addition, in response to wrap ratio S of the preceding vehicle, it is possible to directly set the time constant Tsf.

If Step S505 is determined to be negative, the process advances to Step S507, and correction value RPc computed at step S504 is set as modified correction value RPcc.

On the other hand, when driving intention estimated by estimation system 1 at Step S503 is determined to be for lane keeping, the process advances to Step S508, and the risk potential RP computed by Step S502 is set as modified correction value RPcc without change.

At Step S506, controller 150A reads the accelerator pedal stroke amount AS detected by accelerator pedal stroke sensor 181. At Step S510, controller 150A computes the accelerator pedal reaction force command FA based on risk potential modified correction value RPcc computed at Steps S507 and S508. As in the fourth embodiment, controller 150A computes accelerator pedal reaction force command FA according to the chart of FIG. 16, for example. However, RP is made RPcc. At Step S511, the system transmits accelerator pedal reaction force command FA computed at Step 510 to accelerator pedal reaction force controller 170. This concludes the current method or process.

The thus-described fifth embodiment is capable of providing the following operational effects.

(1) Controller 150A corrects risk potential RP based on driving intention estimation results, and it also further corrects risk potential based on wrap ratio S between the subject vehicle and the preceding vehicle when the estimation result of estimation system 1 is based on the second imaginary driver operational input Oid_2. This enables reduction of the operation reaction force computed in correspondence with risk potential RP, and it allows transfer of risk potential by controlling operation reaction force in a way that does not inhibit the driving intention of the real driver.

(2) Controller 150A corrects in a manner such that risk potential RP becomes smaller when the driving intention estimation result is for lane changing as compared to the situation in which there is no intention for lane changing, and it further corrects so that risk potential RP becomes smaller. This enables reduction of the operation reaction force computed in correspondence with risk potential RP, and it allows transfer of risk potential by controlling operation reaction force in a way that does not inhibit the driving intention of the real driver to the extent that duplication rate S is small. The reduction of the risk potential RP when lane changing intention is estimated, and the further reduction of risk potential RP in conditions forecasting that duplication rate S will become smaller and the subject vehicle will quickly execute lane changing, and so does not inhibit driver operation when attempting to execute lane changing.

As described in the first through third embodiments, with second IDOI calculator 60, the second imaginary driver operational input Oid_2 is computed using the wrap ratio S for the subject vehicle and the preceding vehicle as a relative position relationship between the subject vehicle and a forward obstacle. However, it is also possible to use a relative position relationship from another source.

As described above in connection with the second embodiment, lane changing intention estimation threshold value T is set to correspond to the turning curvature ρ of the roadway being traveled by the subject vehicle. It is possible to apply this to the first and third embodiments.

With the first and third embodiments, after calculating the first and second imaginary driver operation similarity Pid_1 and Pid_2 by using the first and second imaginary driver operational inputs Oid_1 and Oid_2, this system selects the imaginary driver model in response to the running conditions, and it computes the operational input collective similarity Pids of the first and second imaginary drivers. However, the processing order is not so limited, and after the system has computed the operational input collective similarity Pids of the first and second imaginary drivers, it is possible to select the imaginary driver model according to the running conditions. However, in considering the calculation factors, it is desirable to compute the operational input collective similarity Pids after selecting the imaginary driver model.

In the first and second embodiments, this system computes the collective operational input degree of similarity Pids from the current time to a predetermined time in the past for the first imaginary driver and the real driver, and it computes lane changing intention score Sc using Formula 18 based on the collective similarity Pids. However, the system is not limited to this method, and the system could compute the lane changing intention score Sc based on the operational input similarity Pid at the current point in time for the first imaginary driver and real driver, and estimate driving intention.

In addition, as a substitution for computing the lane changing intention likelihood score Sc, this system could compute a lane keeping intention likelihood score from the lane changing intention likelihood Pr(LC) and the lane keeping intention likelihood Pr(LK), and it could estimate lane keeping intention by comparing these threshold values. Furthermore, in the same way as in the third embodiment, without computing this score Sc, it is possible to estimate the driving intention of the real driver and the driving intention of the imaginary driver having a maximum degree of similarity from among the operational input collective similarity Pids of the selected imaginary driver model.

Moreover, with the forms shown in the first through the third embodiments, it is possible to compute driving intention estimation using the lane changing intention score Sc computed by Formula 18, and it is possible to execute driving intention estimation based on operational input similarity of the first imaginary driver and the real driver.

In the fourth and fifth embodiments, the system computes risk potential RP using the surplus time TTC and time headway THW between the subject vehicle and the preceding vehicle. However, the process is not limited to this method, and it is possible for example to use the reciprocal number of the surplus time TTC as the risk potential. In addition, the relationship between risk potential RP and reaction force compliment $\Delta F$ is not limited to that shown in FIG. 16, whereby the system can use various charts to add a reaction force compliment $\Delta F$ to the extent that risk potential RP could become greater.

In the fourth embodiment, the system corrects and performs modified correction of reaction force command value FA for which reaction force compliment $\Delta F$ is normally added to the reaction force corresponding to risk potential RP, but the system is not limited to this method, and it is possible to compute the modified correction value FAcc of reaction force command value FA by adding reaction force complement $\Delta F$ to normal reaction force properties after it is corrected.

In the above described first through fifth embodiments, vehicle surroundings detector 20 may function as a vehicle surroundings detection device and a running conditions detection device, operational input detector 10 may function as an operational input detection device, first IDOI calculator 40 may function as a first imaginary driver operational input calculation device, second IDOI calculator 60 may function as a second imaginary driver operational input calculation device, hypothetically driver operational model selector may function as an imaginary driver operational input selection device, first and second IDOI similarity calculators 50 and 70 may function as an operational input degree of similarity calculation device, first IDOI similarity calculator 50 may function as a first operational input similarity calculation device, second IDOI similarity calculator 70 may function as a second operational input similarity calculation device, and driving intention estimator 90 may function as a driving intention estimation device. In addition, laser radar 110, forward camera 120, and speed sensor 140 may function as an obstacle detection device, risk potential calculator 151 may function as a risk potential calculation device, accelerator pedal reaction force command value calculators 152 and 155 may function as an operational reaction force calculation device, and accelerator pedal reaction force controller 178 may function as an operational reaction force generation device. The accelerator pedal reaction force command corrector 152 and risk potential corrector 154 may function as correction devices; however, there is no limitation to these methods described above, and the obstacle detection device can employ a separate system such as millimeter wave radar. In addition, the operation reaction force generation device can be used for a vehicle operation mechanism other than the accelerator pedal; for example, it is possible to use a steering reaction force control device to generate a steering reaction force to a steering device.

While the present systems have been described in connection with certain specific embodiments thereof, this is by way of illustration and not of limitation, and the appended claims should be construed as broadly as the prior art will permit.

What is claimed is:

1. A system for estimating a driving intention of an operator of a vehicle comprising:

an information detector that detects information necessary to operate the vehicle;

an operational input detection device for detecting an operational input by the operator;

first and second imaginary driver operational input calculation devices configured to respectively calculate imaginary operational inputs of multiple imaginary drivers, wherein the first and second imaginary driver operational input calculation devices incorporate different methods for formulating the multiple imaginary drivers and calculating the imaginary operational inputs, each of the multiple imaginary drivers representing a reference model target position of the vehicle different from its current position and a respective imaginary operational input associated with an action needed by that imaginary driver to attain its respective reference model target position of the vehicle;

an imaginary driver operational input selection device configured to select one of the multiple imaginary drivers based on the imaginary operational inputs calculated by the first and second imaginary driver operational input calculation devices; and a driving intention estimator configured to estimate an intention of the operator based on the operational input of the operator detected by the operational input detection device and the one of the multiple imaginary drivers selected by the imaginary driver operational input selection device.

2. The system according to claim 1, wherein the different methods comprise a first method and a second method that differs from the first method, wherein the first imaginary driver operational input calculation device is configured to calculate the imaginary operational input by the first method based on first information and the second imaginary driver operational input calculation device is configured to calculate the imaginary operational input by the second method based on second information, the second information being different from the first information.

3. The system for estimating a driver intention according to claim 1, further comprising:
   a running condition detection device for detecting at least one running condition of the vehicle or external of the vehicle.

4. The system according to claim 3, wherein the imaginary driver operational input selection device is configured to selectively choose the one of the multiple imaginary drivers based on a degree of similarity of the vehicle to a preceding vehicle detected by the running condition detection device.

5. The system according to claim 3, wherein the imaginary driver operational input selection device is configured to selectively choose the one of the multiple imaginary drivers based on a turning curvature of a roadway detected by the running condition detection device.

6. The system according to claim 3, wherein the imaginary driver operational input selection device is configured to selectively choose the one of the multiple imaginary drivers based on vehicle speed of the vehicle detected by the running condition detection device.

7. The system according to claim 3, wherein the driving intention estimator is configured to modify, based on a turning curvature of a roadway detected by the running condition detection device a driving intention estimation standard used to estimate the intention by the operator.

8. The system according to claim 7, wherein the driving intention estimator is configured to modify the driving intention estimation standard by increasing the driving intention estimation standard as the turning curvature becomes larger.

9. The system according to claim 5, further comprising:
   an obstacle detection device for detecting obstacle conditions in the surroundings of the vehicle;
   a risk potential calculation device configured to calculate a risk potential of the vehicle surroundings based on detection results from the obstacle detection device;
   an operation reaction force calculation device configured to calculate an operation reaction force to be transmitted to an accelerator pedal based on the risk potential computed by the risk potential calculation device;
   an operation reaction force generation device configured to transmit the operation reaction force to the accelerator pedal; and
   a correction device configured to correct the operation reaction force to be transmitted to the accelerator pedal based on the intention of the operator from the driving intention estimator.

10. The system according to claim 9 wherein the correction device is further configured to selectively correct the risk potential based on a duplication rate of a preceding vehicle when the intention from the driving intention estimator is based on calculation results of the second imaginary driver operational input calculation device.

11. The system according to claim 10 wherein the correction device is configured to selectively correct the risk potential such that the risk potential becomes smaller when the intention from the driving intention estimator indicates lane changing as compared to when the intention is not for lane changing, and so that the risk potential becomes smaller when the duplication rate is below a predetermined threshold.

12. The system according to claim 9 wherein the correction device is configured to selectively correct the operation reaction force based on a duplication ratio for a preceding vehicle when the intention from the driving intention estimator is based on calculation results of the second imaginary driver operational input calculation device.

13. The system according to claim 9, wherein the correction device is configured to correct the operation reaction force such that the operation reaction force becomes smaller when the intention from the driving intention estimator is for lane changing as compared to when the intention is not for lane changing, and to correct the operation reaction force so that the operation reaction force becomes smaller when the duplication rate is below a predetermined threshold.

14. A method of estimating a driving intention of an operator of a vehicle, the method comprising:
   detecting information necessary to operate the vehicle;
   detecting an operation of the operator;
   calculating imaginary operations of a plurality of imaginary drivers based on the information necessary to operate the vehicle, wherein each of the plurality of imaginary drivers represents a reference model target position of the vehicle different from its current position and a respective imaginary operation is associated an action needed by that imaginary driver to attain its respective reference model target position; and wherein at least some of the imaginary operations are calculated according to a different method for formulating an imaginary driver and calculating the imaginary operations from others of the imaginary operations;
   selecting one of the plurality of imaginary drivers based on the calculated imaginary operations;
   estimating an intention of the operator based on the detected operation of the operator and the selected one of the plurality of imaginary drivers; and
   providing the intention to a driving assistance device that assists the operator based on the intention.

15. A system for estimating a driving intention of an operator of a vehicle comprising:
   information detecting means that detects information necessary to operate the vehicle;
   a real driver operation detecting means that detects an operation of the operator;
   at least two imaginary driver operation calculating means for respectively calculating imaginary operations of a plurality of imaginary drivers based on the information from the information detecting means, wherein each of the at least two imaginary driver operation calculating means calculate the imaginary operations of the plurality of imaginary drivers based on a different method for formulating an imaginary driver and calculating the imaginary operations, each of the plurality of imaginary drivers representing a reference model target position of the vehicle different from its current position and a respective imaginary operation associated with an action needed by that imaginary driver to attain its respective reference model target position of the vehicle;
   selecting means for selecting one of the plurality of imaginary drivers based on the imaginary operations calculated by the at least two imaginary driver operation calculating means; and
   intention estimating means for estimating an intention of the operator based on the operation of the operator detected by the real driver operation detecting means and the one of the plurality of imaginary drivers selected by the selecting means.

16. A system for estimating an intention of a vehicle driver comprising:
   a vehicle surroundings detection device for detecting vehicle surroundings;
   an operational input detection device for detecting operational input by the driver;
   a first imaginary driver operational input calculation device configured to calculate a respective operational input by a first method based on the vehicle surroundings detected by the vehicle surroundings detection device in order to realize the driving intention of each imaginary driver of multiple differing imaginary drivers provided with different driving intentions;

a second imaginary driver operational input calculation device configured to calculate a respective operational input by a second method based on information differing from the vehicle surroundings in order to realize the driving intention of each imaginary driver of multiple differing imaginary drivers provided with different driving intentions, the second method different from the first method;

a running condition detection device for detecting at least one running condition of the vehicle or external of the vehicle;

an imaginary driver operational input selection device configured to select either the operational inputs of the multiple differing imaginary drivers calculated by the first imaginary driver operation calculation device or the operational inputs of multiple differing imaginary drivers calculated by the second driver operational input calculation device based on the at least one running condition detected by the running condition detection device;

an operational input degree of similarity calculation device for calculating each degree of similarity between the operational inputs of the multiple differing imaginary drivers selected by the imaginary driver operational input selection device and the operational input of the operator detected by the operational input detection device; and a driving intention estimation device configured to estimate a driving intention of the operator based on the multiple degrees of similarity computed by the operational input similarity calculation device.

* * * * *